(12) United States Patent
Keyghobad et al.

(10) Patent No.: US 8,407,333 B2
(45) Date of Patent: *Mar. 26, 2013

(54) METHOD AND APPARATUS FOR INEXPENSIVELY MONITORING AND CONTROLLING REMOTELY DISTRIBUTED APPLIANCES

(75) Inventors: Seyamak Keyghobad, Marion, MA (US); David Rodgers, Shaker Heights, OH (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/372,408

(22) Filed: Feb. 13, 2012

(65) Prior Publication Data

US 2012/0191868 A1 Jul. 26, 2012

Related U.S. Application Data

(63) Continuation of application No. 12/490,867, filed on Jun. 24, 2009, now Pat. No. 8,140,667, which is a continuation of application No. 12/243,452, filed on Oct. 1, 2008, now Pat. No. 7,752,309, which is a continuation of application No. 10/298,300, filed on Nov. 18, 2002, now Pat. No. 7,444,401.

(51) Int. Cl.
*G06F 15/173* (2006.01)

(52) U.S. Cl. ........ 709/223; 709/203; 709/217; 455/41.2; 455/41.3

(58) Field of Classification Search .................. 709/224, 709/203, 217, 223; 455/41.2, 41.3
See application file for complete search history.

(56) References Cited

U.S. PATENT DOCUMENTS

| | | | |
|---|---|---|---|
| 1,788,618 A | 1/1931 | Cover | |
| 3,254,660 A | 6/1966 | Ray | |
| 3,593,957 A | 7/1971 | Dolter | |
| 3,705,385 A | 12/1972 | Batz | |
| 4,093,997 A | 6/1978 | Germer | |
| 4,120,031 A | 10/1978 | Kincheloe et al. | |
| 4,291,375 A | 9/1981 | Wolf | |
| 4,388,690 A | 6/1983 | Lumsden | |
| 4,414,633 A | 11/1983 | Churchill | |
| 4,442,492 A | 4/1984 | Karlsson et al. | |
| 4,465,970 A | 8/1984 | DiMassimo et al. | |
| 4,516,213 A | 5/1985 | Gidden | |
| 4,542,469 A | 9/1985 | Brandyberry et al. | |

(Continued)

FOREIGN PATENT DOCUMENTS

| CN | 1185838 | 6/1998 |
|---|---|---|
| GB | 2305333 | 4/1997 |

(Continued)

OTHER PUBLICATIONS

Splitz, David. E.; U.S. Patent Application Entitled: Systems and Methods for Time-Based Hailing of Radio Frequency Devices assigned U.S. Appl. No. 13/283,526, filed Oct. 27, 2011, 51 pages.

(Continued)

*Primary Examiner* — Lashonda Jacobs
(74) *Attorney, Agent, or Firm* — Taylor English Duma LLP

(57) ABSTRACT

A method and associated apparatus are described that enables unattended, remotely distributed appliances, such as vending machines, utility meters, thermostats and kitchen appliances (ovens, washing machines, refrigerators, etc.) to be connected inexpensively to each other and to a centrally located server. The apparatus 1) uses relatively simple "personality" modules to adapt the apparatus to the application in combination with a sophisticated core module that provides the intelligence needed to process data locally, to format that data and to transfer it to a remote server and 2) uses existing Internet-based communication links, thereby avoiding the costly proprietary links used with current state-of-the-art solutions.

20 Claims, 14 Drawing Sheets

U.S. PATENT DOCUMENTS

| | | |
|---|---|---|
| 4,591,988 A | 5/1986 | Klima et al. |
| 4,707,852 A | 11/1987 | Jahr et al. |
| 4,727,900 A | 3/1988 | Dooling et al. |
| 4,792,946 A | 12/1988 | Mayo |
| 4,803,632 A | 2/1989 | Frew et al. |
| 4,833,618 A | 5/1989 | Verma et al. |
| 4,868,566 A | 9/1989 | Strobel et al. |
| 4,881,070 A | 11/1989 | Burrowes et al. |
| 4,940,976 A | 7/1990 | Gastouniotis et al. |
| 4,967,996 A | 11/1990 | Sonoda et al. |
| 5,056,107 A | 10/1991 | Johnson et al. |
| 5,075,792 A | 12/1991 | Brown et al. |
| 5,079,715 A | 1/1992 | Venkataraman et al. |
| 5,239,575 A | 8/1993 | White et al. |
| 5,251,480 A | 10/1993 | Brunson, IV et al. |
| 5,267,587 A | 12/1993 | Brown |
| 5,298,894 A | 3/1994 | Cerny et al. |
| 5,381,136 A | 1/1995 | Powers et al. |
| 5,434,911 A | 7/1995 | Gray et al. |
| 5,438,329 A | 8/1995 | Gastouniotis et al. |
| 5,451,938 A | 9/1995 | Brennan, Jr. |
| 5,459,459 A | 10/1995 | Lee, Jr. |
| 5,481,259 A | 1/1996 | Bane |
| 5,493,287 A | 2/1996 | Bane |
| 5,519,387 A | 5/1996 | Besier et al. |
| 5,525,898 A | 6/1996 | Lee et al. |
| 5,553,094 A | 9/1996 | Johnson et al. |
| 5,590,179 A | 12/1996 | Shincovich et al. |
| 5,594,740 A | 1/1997 | LaDue |
| 5,617,084 A | 4/1997 | Sears |
| 5,631,554 A | 5/1997 | Briese et al. |
| 5,673,252 A | 9/1997 | Johnson et al. |
| 5,708,195 A | 1/1998 | Kurisu et al. |
| 5,714,931 A | 2/1998 | Petite |
| 5,748,104 A | 5/1998 | Argyroudis et al. |
| 5,751,797 A | 5/1998 | Saaden |
| 5,801,643 A | 9/1998 | Williams et al. |
| 5,815,086 A | 9/1998 | Ivie et al. |
| 5,852,658 A | 12/1998 | Knight et al. |
| 5,877,703 A | 3/1999 | Bloss et al. |
| 5,892,758 A | 4/1999 | Argyroudis |
| 5,907,491 A | 5/1999 | Canada et al. |
| 5,924,051 A | 7/1999 | Provost et al. |
| 5,926,103 A | 7/1999 | Petite |
| 5,926,531 A | 7/1999 | Petite |
| 5,940,009 A | 8/1999 | Loy et al. |
| 5,963,146 A | 10/1999 | Johnson et al. |
| 5,971,011 A | 10/1999 | Price |
| 5,979,863 A | 11/1999 | Lousberg |
| 5,986,573 A | 11/1999 | Franklin et al. |
| 5,994,892 A | 11/1999 | Turino et al. |
| 6,006,212 A | 12/1999 | Schleich et al. |
| 6,028,522 A | 2/2000 | Petite |
| 6,031,455 A | 2/2000 | Grube et al. |
| 6,031,466 A | 2/2000 | Leshets et al. |
| 6,044,062 A | 3/2000 | Brownrigg |
| 6,058,374 A | 5/2000 | Guthrie et al. |
| 6,060,994 A | 5/2000 | Chen |
| 6,069,571 A | 5/2000 | Tell |
| 6,081,204 A | 6/2000 | Lavoie et al. |
| 6,150,955 A | 11/2000 | Tracy et al. |
| 6,152,173 A | 11/2000 | Makowan |
| 6,163,276 A | 12/2000 | Irving et al. |
| 6,172,616 B1 | 1/2001 | Johnson et al. |
| 6,195,018 B1 | 2/2001 | Ragle et al. |
| 6,218,953 B1 | 4/2001 | Petite |
| 6,233,327 B1 | 5/2001 | Petite |
| 6,246,677 B1 | 6/2001 | Nap et al. |
| 6,249,516 B1 | 6/2001 | Brownrigg et al. |
| 6,288,641 B1 | 9/2001 | Casais |
| 6,317,051 B1 | 11/2001 | Cohen |
| 6,333,975 B1 | 12/2001 | Brun et al. |
| 6,373,399 B1 | 4/2002 | Johnson et al. |
| 6,424,270 B1 | 7/2002 | Ali |
| 6,430,268 B1 | 8/2002 | Petite |
| 6,437,692 B1 | 8/2002 | Petite et al. |
| 6,470,903 B2 | 10/2002 | Reyman |
| 6,493,377 B2 | 12/2002 | Schilling et al. |
| 6,512,463 B1 | 1/2003 | Campbell et al. |
| 6,528,957 B1 | 3/2003 | Luchaco |
| 6,538,577 B1 | 3/2003 | Ehrke et al. |
| 6,560,543 B2 | 5/2003 | Wolfe et al. |
| 6,564,159 B1 | 5/2003 | Lavoie et al. |
| 6,577,961 B1 | 6/2003 | Holdsclaw et al. |
| 6,618,578 B1 | 9/2003 | Petite |
| 6,624,750 B1 | 9/2003 | Marman et al. |
| 6,628,207 B1 | 9/2003 | Hemminger et al. |
| 6,628,764 B1 | 9/2003 | Petite |
| 6,633,781 B1 | 10/2003 | Lee |
| 6,653,945 B2 | 11/2003 | Johnson et al. |
| 6,657,552 B2 | 12/2003 | Belski et al. |
| 6,675,071 B1 | 1/2004 | Griffin, Jr. et al. |
| 6,677,861 B1 | 1/2004 | Henry et al. |
| 6,701,956 B1 | 3/2004 | Berger |
| 6,710,721 B1 | 3/2004 | Holowick |
| 6,747,557 B1 | 6/2004 | Petite |
| 6,798,352 B2 | 9/2004 | Holowick |
| 6,836,737 B2 | 12/2004 | Petite et al. |
| 6,847,300 B2 | 1/2005 | Yee et al. |
| 6,891,838 B1 | 5/2005 | Petite |
| 6,914,533 B2 | 7/2005 | Petite |
| 6,914,893 B2 | 7/2005 | Petite |
| 6,931,445 B2 | 8/2005 | Davis |
| 6,946,972 B2 | 9/2005 | Mueller et al. |
| 6,954,701 B2 | 10/2005 | Wolfe |
| 6,954,814 B1 | 10/2005 | Leach |
| 6,978,210 B1 | 12/2005 | Suter et al. |
| 6,980,079 B1 | 12/2005 | Shintani et al. |
| 7,008,239 B1 | 3/2006 | Ju |
| 7,009,530 B2 | 3/2006 | Zigdon et al. |
| 7,012,546 B1 | 3/2006 | Zigdon et al. |
| 7,042,368 B2 | 5/2006 | Patterson et al. |
| 7,053,767 B2 | 5/2006 | Petite et al. |
| 7,054,271 B2 | 5/2006 | Brownrigg |
| 7,061,924 B1 | 6/2006 | Durrant et al. |
| 7,072,945 B1 * | 7/2006 | Nieminen et al. ............ 709/217 |
| 7,079,810 B2 | 7/2006 | Petite |
| 7,088,239 B2 | 8/2006 | Basinger et al. |
| 7,089,125 B2 | 8/2006 | Sonderegger |
| 7,099,781 B1 | 8/2006 | Heidl et al. |
| 7,103,511 B2 | 9/2006 | Petite |
| 7,117,051 B2 * | 10/2006 | Landry et al. .................. 700/83 |
| 7,124,184 B2 | 10/2006 | Chung et al. |
| 7,137,550 B1 | 11/2006 | Petite |
| 7,142,107 B2 | 11/2006 | Kates |
| 7,248,181 B2 | 7/2007 | Patterson et al. |
| 7,256,704 B2 | 8/2007 | Yoon et al. |
| 7,263,073 B2 | 8/2007 | Petite |
| 7,272,635 B1 | 9/2007 | Longtin et al. |
| 7,292,143 B2 | 11/2007 | Drake et al. |
| 7,295,128 B2 | 11/2007 | Petite |
| 7,301,456 B2 | 11/2007 | Han |
| 7,315,257 B2 | 1/2008 | Patterson et al. |
| 7,342,504 B2 | 3/2008 | Crane et al. |
| 7,349,766 B2 | 3/2008 | Rodgers |
| 7,353,280 B2 | 4/2008 | Chiles et al. |
| 7,356,614 B2 | 4/2008 | Kim et al. |
| 7,363,031 B1 | 4/2008 | Aisa |
| 7,385,524 B1 | 6/2008 | Orlosky |
| 7,397,907 B2 | 7/2008 | Petite |
| 7,417,557 B2 | 8/2008 | Osterloh et al. |
| 7,423,985 B1 | 9/2008 | Hill |
| 7,424,527 B2 | 9/2008 | Petite |
| 7,443,313 B2 | 10/2008 | Davis et al. |
| 7,444,499 B2 | 10/2008 | Davis et al. |
| 7,453,373 B2 | 11/2008 | Cumeralto et al. |
| 7,468,661 B2 | 12/2008 | Petite et al. |
| 7,478,108 B2 | 1/2009 | Townsend et al. |
| 7,480,501 B2 | 1/2009 | Petite |
| 7,526,539 B1 | 4/2009 | Hsu |
| 7,533,693 B2 | 5/2009 | Colton et al. |
| 7,650,425 B2 | 1/2010 | Davis |
| 7,697,492 B2 | 4/2010 | Petite |
| 7,739,378 B2 | 6/2010 | Petite |
| 7,746,246 B2 | 6/2010 | Salser |
| 7,752,309 B2 | 7/2010 | Keyghobad |
| 7,756,086 B2 | 7/2010 | Petite |

| | | |
|---|---|---|
| 7,783,738 B2 | 8/2010 | Keyghobad et al. |
| 7,792,946 B2 | 9/2010 | Keyghobad et al. |
| 7,880,641 B2 | 2/2011 | Parris et al. |
| 7,980,317 B1 | 7/2011 | Preta et al. |
| 8,109,131 B2 | 2/2012 | Winter |
| 8,140,667 B2 | 3/2012 | Keyghobad et al. |
| 8,351,409 B2 | 1/2013 | Albert et al. |
| 2001/0010032 A1 | 7/2001 | Ehlers et al. |
| 2001/0024163 A1 | 9/2001 | Petite |
| 2001/0048030 A1 | 12/2001 | Sharood |
| 2002/0013679 A1 | 1/2002 | Petite |
| 2002/0019725 A1 | 2/2002 | Petite |
| 2002/0031101 A1 | 3/2002 | Petite |
| 2002/0051546 A1 | 5/2002 | Bizjak |
| 2002/0062392 A1 | 5/2002 | Nishikawa |
| 2002/0067717 A1 | 6/2002 | Raschke |
| 2002/0073183 A1 | 6/2002 | Yoon |
| 2002/0089802 A1 | 7/2002 | Beckwith |
| 2002/0130768 A1 | 9/2002 | Che et al. |
| 2002/0169643 A1 | 11/2002 | Petite |
| 2002/0190956 A1 | 12/2002 | Klein |
| 2003/0009515 A1 | 1/2003 | Lee |
| 2003/0018733 A1 | 1/2003 | Yoon |
| 2003/0018776 A1 | 1/2003 | Yoon et al. |
| 2003/0036810 A1 | 2/2003 | Petite |
| 2003/0046377 A1 | 3/2003 | Daum |
| 2003/0074109 A1 | 4/2003 | Jeong |
| 2003/0107485 A1 | 6/2003 | Zoratti |
| 2004/0010561 A1 | 1/2004 | Kim et al. |
| 2004/0054747 A1 | 3/2004 | Breh et al. |
| 2004/0129312 A1 | 7/2004 | Cuzzo et al. |
| 2004/0139210 A1 | 7/2004 | Lee et al. |
| 2004/0158333 A1 | 8/2004 | Ha et al. |
| 2004/0183687 A1 | 9/2004 | Petite |
| 2005/0067022 A1 | 3/2005 | Istre |
| 2005/0078631 A1 | 4/2005 | Cornwall |
| 2005/0096753 A1 | 5/2005 | Arling |
| 2005/0104747 A1 | 5/2005 | Silic et al. |
| 2005/0121880 A1 | 6/2005 | Santangelo |
| 2005/0159823 A1 | 7/2005 | Hayes |
| 2005/0190784 A1 | 9/2005 | Stine |
| 2005/0195768 A1 | 9/2005 | Petite |
| 2005/0195775 A1 | 9/2005 | Petite |
| 2005/0201397 A1 | 9/2005 | Petite |
| 2005/0203647 A1 | 9/2005 | Landry |
| 2006/0028355 A1 | 2/2006 | Patterson et al. |
| 2006/0041655 A1 | 2/2006 | Holloway |
| 2006/0098576 A1 | 5/2006 | Brownrigg |
| 2006/0158347 A1 | 7/2006 | Roche et al. |
| 2006/0201550 A1 | 9/2006 | Blyth et al. |
| 2006/0218266 A1 | 9/2006 | Matsumoto et al. |
| 2006/0273896 A1 | 12/2006 | Kates |
| 2007/0059986 A1 | 3/2007 | Rockwell |
| 2007/0063866 A1 | 3/2007 | Webb |
| 2007/0091825 A1 | 4/2007 | Budampati et al. |
| 2007/0284293 A1 | 12/2007 | Pitchford et al. |
| 2007/0298779 A1 | 12/2007 | Wolman et al. |
| 2008/0061769 A1 | 3/2008 | Junk et al. |
| 2008/0095403 A1 | 4/2008 | Benhammou |
| 2008/0109090 A1 | 5/2008 | Esmaili et al. |
| 2008/0149180 A1 | 6/2008 | Parris et al. |
| 2008/0186898 A1 | 8/2008 | Petite |
| 2008/0189056 A1 | 8/2008 | Heidl et al. |
| 2008/0281534 A1 | 11/2008 | Hurley |
| 2008/0291054 A1 | 11/2008 | Groft |
| 2009/0058676 A1 | 3/2009 | Orlosky |
| 2009/0068947 A1 | 3/2009 | Petite |
| 2009/0133887 A1 | 5/2009 | Garcia et al. |
| 2009/0153357 A1 | 6/2009 | Bushman et al. |
| 2009/0215424 A1 | 8/2009 | Petite |
| 2009/0243840 A1 | 10/2009 | Petite |
| 2009/0255346 A1 | 10/2009 | Hendey et al. |
| 2009/0287838 A1 | 11/2009 | Keyghobad et al. |
| 2010/0017465 A1 | 1/2010 | Brownrigg |
| 2010/0039984 A1 | 2/2010 | Brownrigg |
| 2010/0194582 A1 | 8/2010 | Petite |
| 2010/0250054 A1 | 9/2010 | Petite |
| 2010/0265909 A1 | 10/2010 | Petite |
| 2010/0312881 A1 | 12/2010 | Davis |
| 2010/0329232 A1 | 12/2010 | Tubb et al. |
| 2011/0044276 A1 | 2/2011 | Albert et al. |
| 2011/0140909 A1 | 6/2011 | Olson et al. |
| 2012/0106518 A1 | 5/2012 | Albert et al. |

FOREIGN PATENT DOCUMENTS

| | | |
|---|---|---|
| JP | 6300606 | 10/1994 |
| JP | 2000285356 | 10/2000 |
| JP | 2012507090 | 3/2012 |
| JP | 2012527706 | 11/2012 |
| WO | 9810299 | 3/1998 |
| WO | 9810394 | 3/1998 |
| WO | 2008087911 | 5/2010 |
| WO | 2010051287 | 5/2010 |
| WO | 2010135587 | 11/2010 |
| WO | 2011159403 | 12/2011 |

OTHER PUBLICATIONS

Splitz, David E.; U.S. Patent Application Entitled: Systems and Methods for Dynamic Squelching in Radio Frequency Devices assigned U.S. Appl. No. 13/339,655, filed Dec. 29, 2011; 50 pgs.

Keyghobad, Seyamak; Non-final office action for U.S. Appl. No. 12/490,925, filed Jun. 24, 2009; mailed Dec. 23, 2009; 12 pgs.

Keyghobad, Seyamak; Notice of Allowance for U. S. Appl. No. 12/490,925, filed Jun. 24, 2009; mailed Aug. 2, 2010; 6 pgs.

Keyghobad, Seyamak; Issue Notification for U.S. Appl. No. 12/490,867, filed Jun. 24, 2009, mailed Feb. 29, 2012; 1 pg.

Splitz, David; International Search Report and Written Opinion for serial No. PCT/US11/58260, filed Oct. 28, 2011, mailed Feb. 7, 2012, 3 pgs.

Splitz, David; International Search Report and Written Opinion for serial No. PCT/US12/22060, filed Jan. 20, 2012, mailed Mar. 29, 2012, 8 pgs.

Splitz, David; PCT Application entitled: Systems and Methods for Dynamic Squelching in Radio Frequency Devices, having serial No. PCT/US12/22060, filed Jan. 20, 2012, 39 pgs.

Splitz, David; PCT Application entitled: Systems and Methods for Time-Based Hailing of Radio Frequency, having serial No. PCT/US11/58260, filed Oct. 28, 2011, 51 pgs.

Keyghobad, Seyamak; Examiner Interview Summary Record for U.S. Appl. No. 10/298,300, filed Nov. 18, 2002; mailed Feb. 5, 2008; 2 pgs.

Keyghobad, Seyamak; Non-Final Rejection for U.S. Appl. No. 10/298,300, filed Nov. 18, 2002; mailed Oct. 26, 2007; 36 pgs.

Keyghobad, Seyamak; Requirement for Restriction/ Election for U.S. Appl. No. 10/298,300, filed Nov. 18, 2002; mailed Feb. 27, 2006; 17 pgs.

Keyghobad, Seyamak; U.S. Patent Application entitled: Method and Apparatus for Inexpensively Monitoring and Controlling Remotely Distributed Appliances under U.S. Appl. No. 10/298,300, filed Nov. 18, 2002; 40 pgs.

Keyghobad, Seyamak; Issue Notification for U.S. Appl. No. 10/298,300, filed Nov. 18, 2002, mailed Oct. 8, 2008; 1 pg.

Keyghobad, Seyamak; Non-Final Rejection for U.S. Appl. No. 10/298,300, filed Nov. 18, 2002; mailed May 18, 2006; 14 pgs.

Keyghobad, Seyamak; Non-Final Rejection or U.S. Appl. No. 10/298,300, filed Nov. 18, 2002; mailed Jun. 6, 2007; 33 pgs.

Keyghobad, Seyamak; Certificate of Correction for U.S. Appl. No. 10/298,300, filed Nov. 18, 2002; mailed Mar. 31, 2009; 1 page.

Keyghobad, Seyamak; Notice of Allowance for U.S. Appl. No. 10/298,300, filed Nov. 18, 2002; mailed Jul. 14, 2008; 6 pgs.

Keyghobad, Seyamak; Issue Notification for U.S. Appl. No. 12/243,452, filed Oct. 1, 2008 mailed Jun. 16, 2010; 1 page.

Keyghobad, Seyamak; Notice of Allowance for U.S. Appl. No. 12/243,452, filed Oct. 1, 2008; mailed Mar. 22, 2010; 8 pgs.

Keyghobad, Seyamak; Examiner Interview Summary Record for U.S. Appl. No. 12/243,452, filed Oct. 1, 2008; mailed Dec. 7, 2009; 3 pgs.

Keyghobad, Seyamak; Non-Final Rejection for U.S. Appl. No. 12/243,452, filed Oct. 1, 2008; mailed Sep. 14, 2009; 12 pgs, Keyghobad,Seyamak; Non-Final Rejection for U.S. Appl. No. 12/243,452, filed Oct. 1, 2008; mailed May 1, 2009; 5 pgs.

Keyghobad, Seyamak; U.S. Patent Application Entitled: Method and Apparatus for Inexpensively Monitoring and Controlling Remotely Distributed Appliancesl under U.S. Appl. No. 12/243,452, filed Oct. 1, 2008; 33 pgs.

Keyghobad, Seyamak; U.S. Patent Application Entitled: Method and Apparatus for Inexpensively Monitoring and Controlling Remotely Distributed Appliances under U.S. Appl. No. 12/490,867, filed Jun. 24, 2009; 33 pgs.

Keyghobad, Seyamak; Non Final Rejection for U.S. Appl. No. 12/490,867, filed Jun. 24, 2009, mailed Oct. 4, 2010; 13 pgs.

Keyghobad, Seyamak; Non Final Rejection for U.S. Appl. No. 12/490,867, filed Jun. 24, 2009, mailed Mar. 21, 2011; 9 pgs.

Keyghobad, Seyamak; Notice of Allowance for U.S. Appl. No. 12/490,867, filed Jun. 24, 2006, mailed Sep. 7, 2011; 6 pgs.

Keyghobad, Seyamak; Notice of Allowance for U.S. Appl. No. 12/490,867, filed Jun. 24, 2009, mailed Nov. 2, 2011; 17 pgs.

Keyghobad, Seyamak; Issue Notification for U.S. Appl. No. 12/490,925, filed Jun. 24, 2009; mailed Aug. 18, 2010; 1 page.

Keyghobad, Seyamak; Notice of Allowance for U.S. Appl. No. 12/490,925, filed Jun. 24, 2009; mailed Aug. 2, 2010; 8 pgs.

Keyghobad, Seyamak; Notice of Allowance for U.S. Appl. No. 12/490,925, filed Jun. 24, 2009; mailed Jul. 19, 2010; 9 pgs.

Keyghobad, Seyamak; Notice of Allowance for U.S. Appl. No. 12/490,925, filed Jun. 24, 2009; mailed Jun. 28, 2010; 10 pgs.

Keyghobad, Seyamak; Non-Final Rejection for U.S. Appl. No. 12/490,925, filed Jun. 24, 2009; mailed Dec. 23, 2009; 17 pgs.

Keyghobad, Seyamak; U.S. Patent Application Entitled: Method and Apparatus for Inexpensively Monitoring and Controlling Remotely Distributed Appliances under U.S. Appl. No. 12/490,925, filed Jun. 24, 2009; 33 pgs.

Keyghobad, Seyamak; Issue Notification for U.S. Appl. No. 12/490,957, filed Jun. 24, 2009; mailed Aug. 4, 2010; 1 page.

Keyghobad, Seyamak; Notice of Allowance for U.S. Appl. No. 12/490,957, filed Jun. 24, 2009; mailed Jun. 24, 2010; 10 pgs.

Keyghobad,Seyamak; Non-Final Rejection for U.S. Appl. No. 12/490,957, filed Jun. 24, 2009; mailed Dec. 23, 2009; 17 pgs.

Keyghobad, Seyamak; U.S. Patent Application Entitled: Method and Apparatus for Inexpensively Monitoring and Controlling Remotely Distributed Appliances under U.S. Appl. No. 12/490,957, filed Jun. 24, 2009; 33 pgs.

Ball, Marty Scott; U.S. Patent Application Entitled: Valve Meter Assembly and Method under U.S. Appl. No. 13/149,720, filed May 31, 2011; 56 pgs.

Young et al. "Real-Time Intranet-Controlled Virtual Instrument Multiple-Circuit Power Monitoring," IEEE Transactions on Instrumentation and Measurement, Jun. 2000. vol. 49, No. 3, pg. 570. [Accessed Dec. 29, 2011] http://ieeexplore.ieee.org/xpls/abs_all.jsp?.

De Almeida et al. "Advanced Monitoring Technologies for the Evaluation of Demand-Side Management Programs," IEEE Transactions on Power Systems, Aug. 1994. vol. 9, No. 3. [Accessed Dec. 29, 2011] http://ieeexplore.ieee.org/xpls/abs_all.jsp?arnumber=336086.

Dolezilek; "Microprocessor Based Relay Information Improves the Power System," Rural Electric Power Conference, May 1999. P. B5/1-B5/9. [Accessed Dec. 29, 2011] http://ieeexplore.ieee.org/xpls/abs_all.jsp? arnumber=768685.

Gehami et al. "Electronic Control System I Salient Feature in Substation," Transmission & Distrubition, Mar. 1991. vol. 43, No. 3, pg. 48. [Accessed Dec. 29, 2011—ProQuest] .

Horlent; "New Metering and Reading Techniques Based on a Modular Design Concept," 10th International Conference on Electricity Distribution, May 1989. vol. 5, pg. 455-459. [Accessed Dec. 29, 2011—IEEExplore] .

"In Brief," Land Mobile Radio News, Jan. 16, 1998. vol. 52, No. 3, p. 1. [Accessed Dec. 29, 2011—ProQuest] http://proquest.umi.com/pqdweb?did=25435781&sid=1&Fmt=3&clientld=31810&RQT=309&VName%20=PQD.

"Landis & Gyr Utilities: Services Partnership Helps Utilities Use Available Resources More Effectively," www.landisgyr.com/utilities/e/fr_press1_e.htm (archived Feb. 6, 1998) http://web.archive.org/web/19980206060801/http://www.landisgyr.com/utilities.

Tamarkin; "Automated Meter Reading", Sep.-Oct. 1992, vol. 50, No. 5/ [Accessed Dec. 29, 2011] http://www.uscicorp.com/news/Automatic_Power_reading_pdf.

Ansi; "Protocol Specification for ANSI Type 2 Optical Port", American National Standard, ANSI C.12.18-2006, 11 pgs.

Federal Communications Commission; "Understanding the FCC Regulations for Low-Power, Non-Licensed Transmitters", Office of Engineering and Technology; Oct. 1993; 34 pgs.

SEMTECH; "TN1200.4, Calculating Radiated Power and Field Strength for Conducted Power Measurements", Semtech Corporation, Camarillo, CA, 2007, 9 pgs.

RFM; "HX 2000 Datasheet: 916.5 MHz: Hybrid Transmitter", RF Monolithics, Inc., Dallas, TX, USA, 1998; 2 pgs.

General Electric "GEH-5081 kV Meter Product Manual", Nov., 1997, 137 pgs.

General Electric; "kV RSX-RS232/RS485 Communications Options: Instructions Manual"; Mar., 1999, 33 pgs.

Orfield; "Badger® Orion® System Helps Lemmon, South Dakota Reduce Read Time, Billing Cycles", Badger Connect Publication, 2004, 2 pgs.

Amco; "Pit Water-Meter Transponder (PWT)"; Amco Automated Systems, LLC; PDB-14611; Sep. 2002; 2 pgs.

Amco; "Short-Range Programmer (Srp) Vrt"; AMCO Automated Systems, LLC; PDB-14555.1; Sep. 2002; 2 pgs.

AMCO; Remote Water-Meter Transponder (RWT); AMCO Automated Systems, LLC; PDB-14610; Sep. 2002; 2 pgs.

Article entitled: "Remote Meter Reading", http://www.meter.co.uk/RMR.html; accessed on Jul. 30, 2012, 2 pgs.

Article entitled: "Datamatic, Badger Connect for AMR Solutions", Jan. 3, 2003, http://www.datamatic.com/badger_partnership.html; accessed on Jul. 27, 2012, 1 pg.

Article entitled: "OET Exhibits List", https://apps.fcc.gov/oetcf/eas/reportsNiewExhibitReport.cfm? mode=Exhibits&RequestTimeout=500&calledFromFrame=N&application_id=194044&fcc_id=; Feb. 20, 2001, 2 pgs.

Hyland; U.S. Patent Application Entitled: Infrastructure Monitoring Devices, Systems and Methods under U.S. Appl. No. 13/101,235, filed May 5, 2011; 28 pgs.

Hyland; International Search Report and Written Opinion for serial no. PCT/US2009/062247, filed Oct. 27, 2009, mailed Dec. 18, 2009; 2 pages.

Hyland; International Search Report and Written Opinion for serial no. PCT/US11/035374, filed May 5, 2011, mailed Sep. 13, 2011; 7 pgs.

Hyland; PCT Application Entitled: Infrastructure Monitoring Devices, Systems, and Methods having serial no. PCT/US11/35374, filed May 5, 2011, 24 pgs.

Hyland; PCT Appplication entitled: Infrastructure Monitoring Devices, Systems, and Methods having serial no. PCT/US10/35666, filed May 20, 2010; 31 pgs.

Hyland; International Search Report and Written Opinion for serial no. PCT/US10/035666, filed May 20, 2010, mailed Jul. 16, 2010, 2 pgs.

Hyland, Gregory E.; Non-Final Office Action for U.S Appl. No. 12/784,300, filed May 20, 2010, mailed Sep. 10, 2012.

Hyland; PCT Application entitled: Infrastructure Monitoring System and Method having serial no. PCT/US09/62247, filed Oct. 27, 2009, 30 pgs.

Hyland, Gregory E.; Non-Final Office Action for Serial No. 12/606,957, filed Oct. 27, 2009 mailed Oct. 18, 2012; 44 pgs.

Hyland; U.S. Provisional Patent Application entitled: Infrastructure Monitoring Devices, Systems, and Methods, having U.S. Appl. No. 61/355,468, filed Jun. 16, 2010; 31 pgs.

Hyland; U.S. Provisional Patent Application entitled: Water Supply Infrastructure Monitoring System and Method, having U.S. Appl. No. 61/108,770, filed Oct. 27, 2008, 11 pgs.

Hyland; U.S. Provisional Patent Application entitled: Water Supply Infrastructure Monitoring System and Method, having U.S. Appl. No. 61/180,600, filed May 22, 2009, 14 pgs.

Hyland; U.S. Patent Application entitled: Infrastructure Monitoring System and Method, having U.S. Appl. No. 12/606,957, filed Oct. 27, 2009, 30 pgs.

Hyland; U.S. Application entitled: Infrastructure Monitoring Devices, Systems, and Methods, having U.S. Appl. No. 12/784,300, filed May 20, 2010, 32 pgs.

Keyghobad, Seyamak; Requirement for Restriction/ Election for U.S. Appl. No. 10/298,300; filed Nov. 18, 2002; mailed Feb. 9, 2006; 11 pages.

European Search Report for Serial No. EP2433440, filed Nov. 18, 2011, mailed Nov. 21, 2012, 6 pgs.

Mexico Office Action for Serial No. MX/A/2011/01283, filed May 20, 2010, mailed Nov. 21, 2012, 3 pgs.

Hyland; International Search Preliminary Report on Patentability for Serial No. PCT/US11/035374, filed May 5, 2011 mailed Dec. 19, 2012; 5 pgs.

Keyghobad, Seyamak; Non-Final Office Action for Serial No. 13/548,914, filed Aug. 21, 2012, mailed Dec. 13, 2012; 39 pgs.

Patterson, Tim; Request for Ex Parte Reexamination under U.S. Appl. No. 90/012,468, filed Sep. 6, 2012; 52 pgs.

Patterson, Tim; Request for Ex Parte Reexamination under U.S. Appl. No. 90/012,449, filed Aug. 23, 2012; 51 pgs.

Radix Corporation; "Automatic Meter Reading", 2 pgs.

Transparent Techcnologies; "Model M1A: Utility Radio Transmitter; M1A Operating Instructions"; 7 pgs.

Trace; "Pit Water-Meter Transponder"; User Guide; 16 pgs.

Keyghobad, Seyamak; U.S. Patent Application entitled: Method and Apparatus for Inexpensively Monitoring and Controlling Remotely Distributed Appliances for U.S. Appl. No. 13/548,914, filed Aug. 21, 2012, 25 pgs.

Hyland; International Preliminary Report on Patentability for Serial No. PCT/US2009/062247, filed Oct. 27, 2009, mailed May 3, 2011, 7 pgs.

* cited by examiner

METHOD AND APPARATUS FOR INEXPENSIVELY MONITORING AND CONTROLLING REMOTELY DISTRIBUTED APPLIANCES

CROSS REFERENCE TO RELATED APPLICATION

This application is a continuation of U.S. patent application Ser. No. 12/490,867, filed Jun. 24, 2009, now U.S. Pat. No. 8,140,667, issued Mar. 20, 2012, which is a continuation of U.S. patent application Ser. No. 12/243,452, filed Oct. 1, 2008, now U.S. Pat. No. 7,752,309, issued Jul. 6, 2010, which is a continuation of U.S. patent application Ser. No. 10/298,300, filed Nov. 18, 2002, now U.S. Pat. No. 7,444,401, issued Oct. 28, 2008, the entireties of which are hereby incorporated by reference herein. Additionally, U.S. patent application Ser. No. 12/490,925, filed Jun. 24, 2009, now U.S. Pat. No. 7,792,946, issued Sep. 7, 2010, and U.S. patent application Ser. No. 12/490,957, filed Jun. 24, 2009, now U.S. Pat. No. 7,783,738, issued Aug. 24, 2010, are continuations of U.S. patent application Ser. No. 12/243,452, filed Oct. 1, 2008, now U.S. Pat. No. 7,752,309, issued Jul. 6, 2010, which is a continuation of U.S. patent application Ser. No. 10/298,300, filed Nov. 18, 2002, now U.S. Pat. No. 7,444,401, issued Oct. 28, 2008, the entireties of which are hereby incorporated by reference herein.

FIELD OF THE INVENTION

This invention relates to both wire-based and wireless communication systems and, in particular, to such systems used to collect data from unattended devices and to control the configuration and operating parameters of such devices.

BACKGROUND OF THE INVENTION

Unattended devices such as vending machines and utility meters all require periodic servicing. Vending machines need to be serviced, on a routine basis, often daily, regardless of their need to be replenished, to collect the cash deposited into the machines and to check their inventories. Many businesses have widely dispersed points of sale that must currently be monitored by employees who periodically travel to these sites to collect receipts and replenish stock. Others depend on customers to report the need for service ore maintenance or for information updates. Utility meters have to be read periodically, usually once each month. These activities take a significant amount of effort and represent significant expense to the vending machine operators and utility companies. This expense could be greatly reduced by monitoring such devices remotely. Vending machines would need to be serviced only when the inventory actually needs to be replenished, the cash container is nearing capacity or the machine is malfunctioning. Meters could be read without requiring someone's physical presence at the site.

Similarly, the ability to control devices such as thermostats from remote locations would enable building managers and utility companies to manage energy consumption dynamically, thereby moderating demand and substantially reducing the cost to the consumer. Building managers can control the environments and monitor security in clusters of buildings much more efficiently if this can be done remotely. Other devices, such as kitchen appliances and cash registers can also benefit from remote monitoring and control by, for example, enabling manufacturers to monitor malfunctions and schedule repairs or by providing real-time cash-flow information. Appliance manufacturers can improve customer satisfaction by monitoring their installed appliances and dispatch service personnel even before the customer is aware of a problem. Another area in which remote monitoring can be useful is in a home and building automation. Such capability would allow travelers or home caretakers to check the temperature in their living rooms and to adjust the heating or air-conditioning accordingly so that it will be comfortable when they arrive home and to open or close drapes or turn on or off the lights remotely to give the appearance of an occupied house or to ensure that their house plants receive the correct amount of sun.

Current techniques to provide such remote monitoring and control capabilities typically rely on proprietary radio-frequency networks, often with limited range, thereby still requiring personnel to travel physically to the site to drive a specially equipped van to within a few hundred yards of the site, or to use private radio frequencies or third-party communication links. Other techniques rely on the presence of a personal computer at the site to provide a communication link between the device of interest and the remote location. In addition, these current techniques require expensive communication hardware, thereby greatly limiting their use in price-sensitive applications. They are also typically tailored to specific applications.

SUMMARY OF THE INVENTION

A three-level architecture is disclosed whereby remotely distributed, unattended appliances such as vending machines, utility meters, thermostats and ordinary household appliances can be inexpensively monitored and controlled from a central site. The apparatus needed to implement the first level, the device level, consists of:

a. a relatively simple and inexpensive device communication module (DCOM) that is tailored to each application and used to convert between the data protocol native to the appliance (e.g., DEX, the data-exchange protocol used in many vending machines or the electrical pulses found in utility meters) to a special protocol used for connecting one or more DCOMs over a local-area network to a module, called the cluster communications module (CCOM), capable of communicating both with the DCOMs and with a central server over the Internet;

b. a CCOM, serving as a master of the aforementioned local-area network and accommodating a plug-in core modules (CM);

c. a CM that is implemented with any one of three Internet access formats, one (the CM-T) having a 56 Kbaud telephony interface, a second (the CM-E) having an Ethernet interface for accessing the Internet over a cable or digital subscriber loop (DSL) and a third (the CM-G) having a GSM/GPRS (Global System for Mobile communication/General Packet Radio Services) interface for accessing the Internet using either of those mechanisms;

d. a CM that, additionally, contains both a digital signal processor (DSP) chip for modulating and demodulating and otherwise processing communication signals, a central processing unit (CPU) for data formatting and processing, a flash memory for storing data processing programs and a random-access memory for storing received data The second level of the architecture, the server level, features a centrally located server, accessible over the Internet by a plurality of CCOMs and by a plurality of users equipped with standard personal computers or handheld Internet access devices. The server implements application-specific data mining, formatting and user interface programs that enable users to access, in an accessible format, that information that is most useful to them. Its database is updated from its associated CCOMs either periodically, on an event-driven basis or on demands relayed to the CCOMs by the server.

The third level in the disclosed architecture, the user level, comprises a plurality of users, each equipped with an Internet access device, such as a personal computer or standard handheld device such as a Palm Pilot or an IPAQ, and running application-specific programs providing user-readable access to relevant information stored in the server. In addition, depending on the application, users are able to send commands through the server to individual CCOMs and, through them, to individual DCOMs, to control such things as item pricing, set points on thermostats and other switch settings.

Advantages include cost savings from reducing or eliminating entirely the need to send personnel to customer sites on a regular basis. Such cost savings can be realized with automatic, remote monitoring, enabling necessary data to be read at a central location, possibly requiring a worker's physical presence only when someone breaks or needs to be replenished. Vending machine companies and utilities are two examples of businesses that can realize substantial benefits through remote monitoring. The cost of the enabling apparatus can be made low enough to be paid for by the cost-savings. The need to customize devices for specific applications and the need to travel to within a certain radio transmission range of the controlled device can be eliminated.

DESCRIPTION OF THE INVENTION

Figure 1:
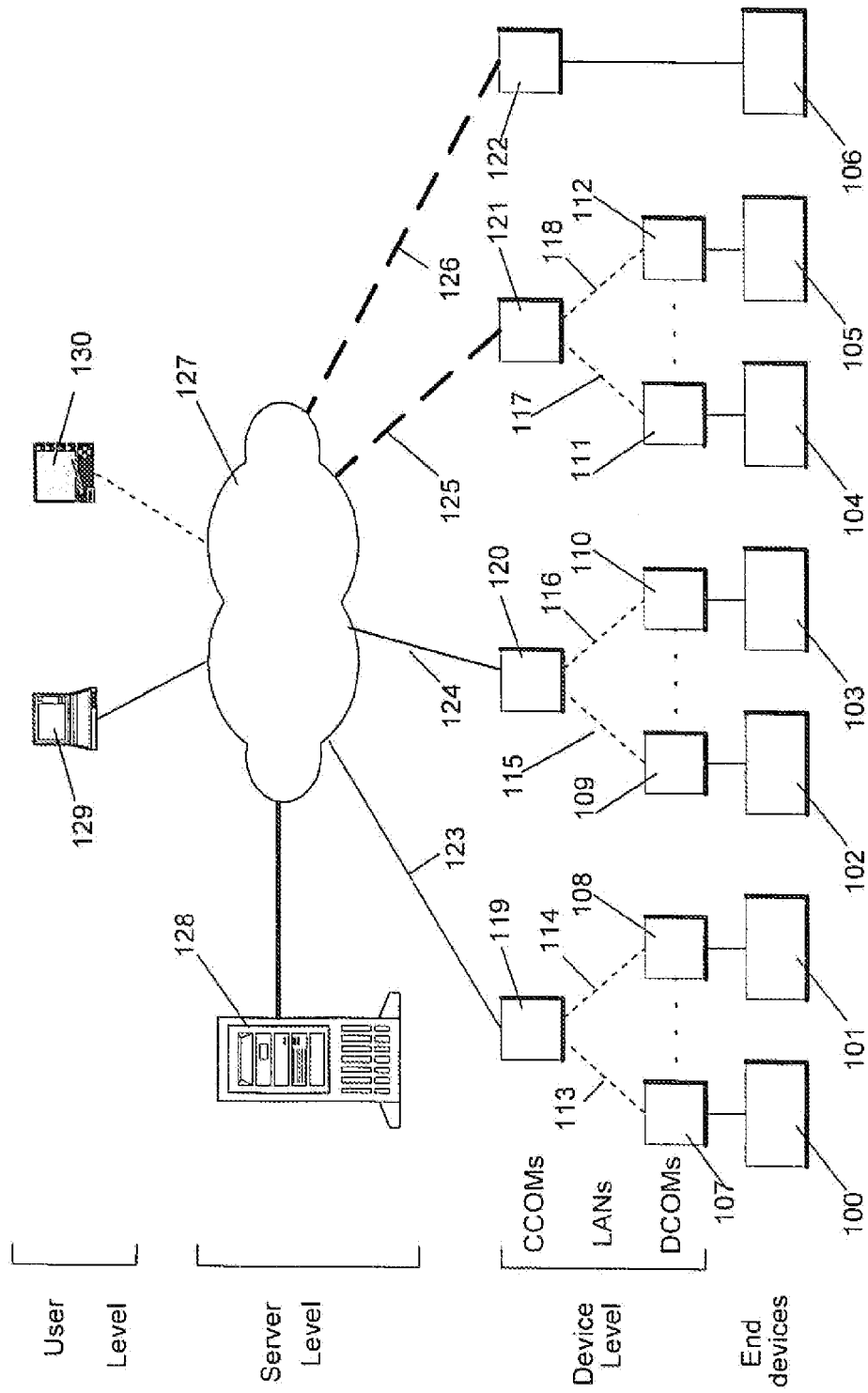
FIG. 1 illustrates the three levels of the inventive system architecture along with the communication links connecting them.

As illustrated in FIG. 1, the present invention is based on a three-level architecture: device level, server level and user level. The device level is composed of the physical entities (100-106) being monitored or controlled remotely (e.g., vending machines, utility meters, thermostats, etc.) The user level is composed of the interfaces (e.g., 129, 130; which may be Palm Pilots or PCs, etc.) through which the user communicates with the system. The server level refers to the central computing facility (128) to which data is transmitted and stored and from which control signals are sent to the devices and formatted information is sent to the user. Communication between the device and server levels and between the server and user levels takes place over the Internet using standard Internet protocols and procedures.

The inventive apparatus at the device level consists of embedded hardware that links the appliance with the Internet. The basic hardware building block is a relatively simple, customizable board, called a device communication module (DCOM). Each DCOM (107-112) contains a power converter and logic to provide physical and electrical interfaces to the appliance or appliances of interest. It communicates with one or more associated appliances using physical connections (e.g., serial RS232 or RS485 lines, TTL ports, power line carrier (PLC) links) and communication protocols (e.g., X.10 commands in home automation applications, the DEX protocol in vending machine applications) particular to that device. The DCOMs in turn use a dedicated, bi-directional, communications protocol, the DCOM/CCOM protocol (DCP), to communicate with a module (119-121) centrally located at the same site, called a cluster communication module (CCOM), over a local-area network (LAN) using any of several physical links (113-118), for example, ISM-band RF links, RS-485 links or power-line carrier (PLC) links, depending on the nature of, and facilities at, the site in question. The DCP supports both a master/slave and a peer-to-peer communications mode, the latter used primarily in those environments in which multiple CCOMs are present and, for reliability purposes, it is advantageous to allow each DCOM to communicate with an alternate CCOM should it not be able to reach its primary CCOM. The DCOM contains sufficient processing power to convert data received from its associated appliance into a format appropriate for communication over the DCP and for converting commands received from the CCOM into appropriate control signals back to the appliance. Since each DCOM module contains only that logic needed to convert between the physical- and link-level appliance and DCP protocols and to serve as a slave on the LAN, it can be very small, of the order of two to three square inches, and sufficiently inexpensive to be incorporated into appliances such as thermostats without prohibitively increasing their cost.

In many applications, each CCOM supports a plurality of DCOMs, in some cases as many as 64 or more. In some applications, however, when devices cannot be efficiently clustered, a CCOM may be able to support only one DCOM. In those applications, the functionality of the DCOM is integrated onto the CCOM (122), thereby eliminating the need for the DCOM as a separate module. In other applications in which large numbers of DCOMs are deployed in a area in which the distance between some of the DCOMs and their associated CCOM may exceed the range of a single LAN, relay communication modules (RCOMs, not shown in FIG. 1) can be inserted between a cluster of DCOMs and the CCOM. Their function is simply to collect data from each of their associated DCOMs and relay that information to the CCOM. Each CCOM, in turn, can be located within range of a plurality of RCOMs, thereby significantly increasing the number of DCOMs that can be supported by one CCOM.

Each CCOM communicates over the Internet (127) using any one of three wide-area network (WAN) access methods: In installations in which a telephone line is readily available, it may use a telephony link (123). In installations having cable access to the Internet, it may use an Ethernet link (124). When neither of these two access methods is convenient, it uses a GSM/GPRS link (125-126).

Figure 2A:
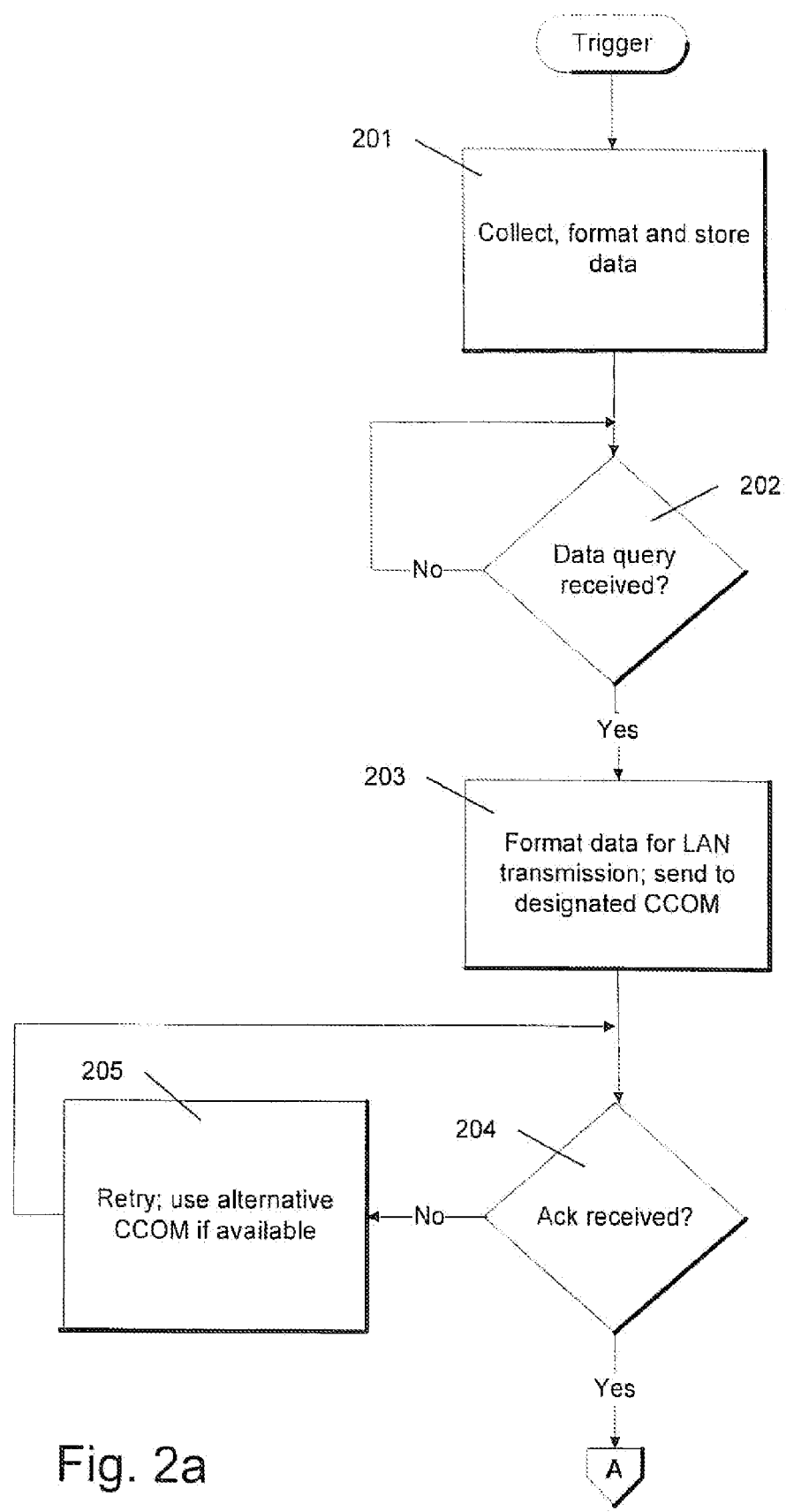
FIGS. 2a-2c show a flowchart describing a procedure whereby data is transferred from a device to a central server where it can be accessed by a authenticated user.
Figure 2B:
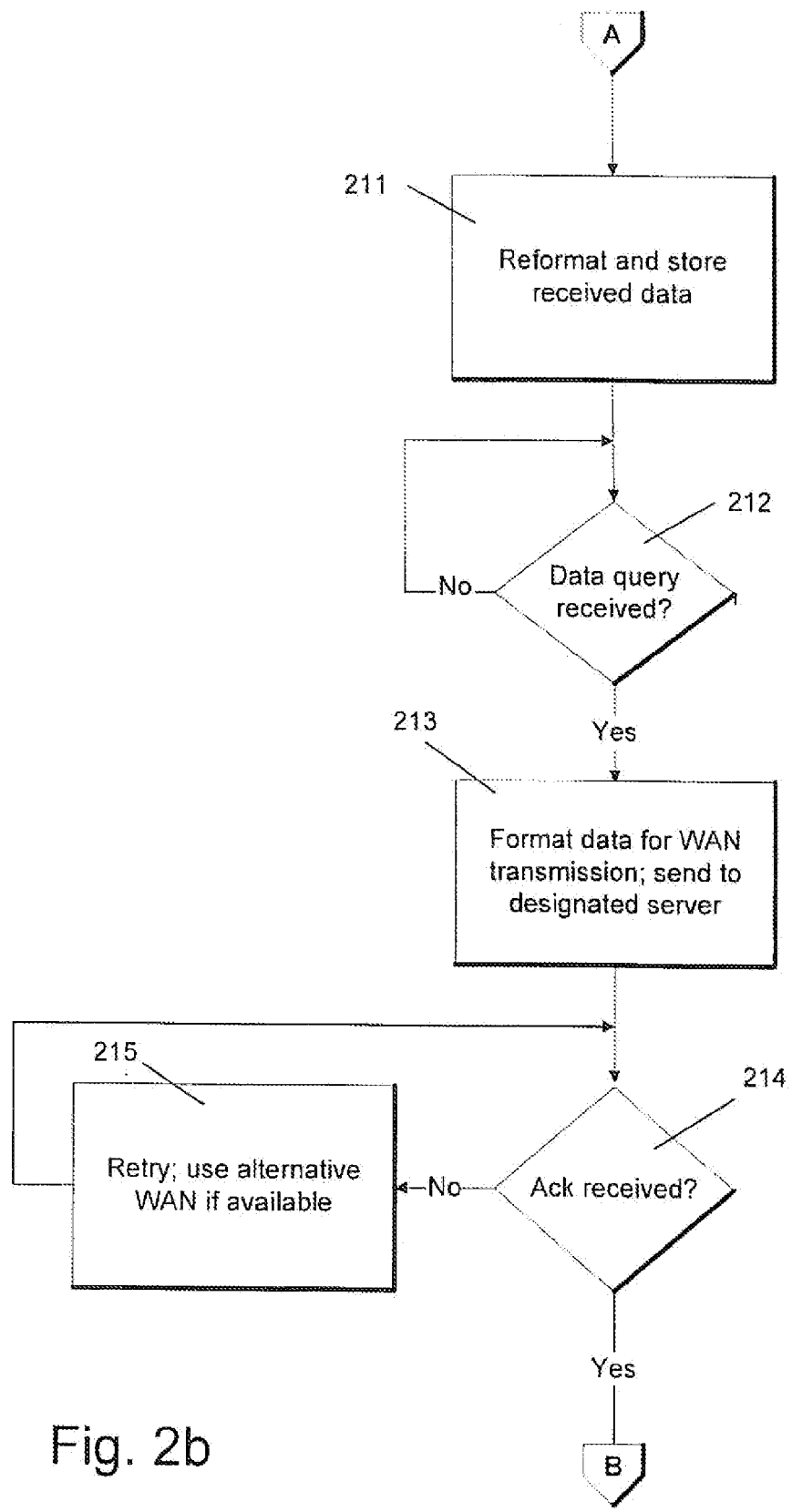
Figure 2C:
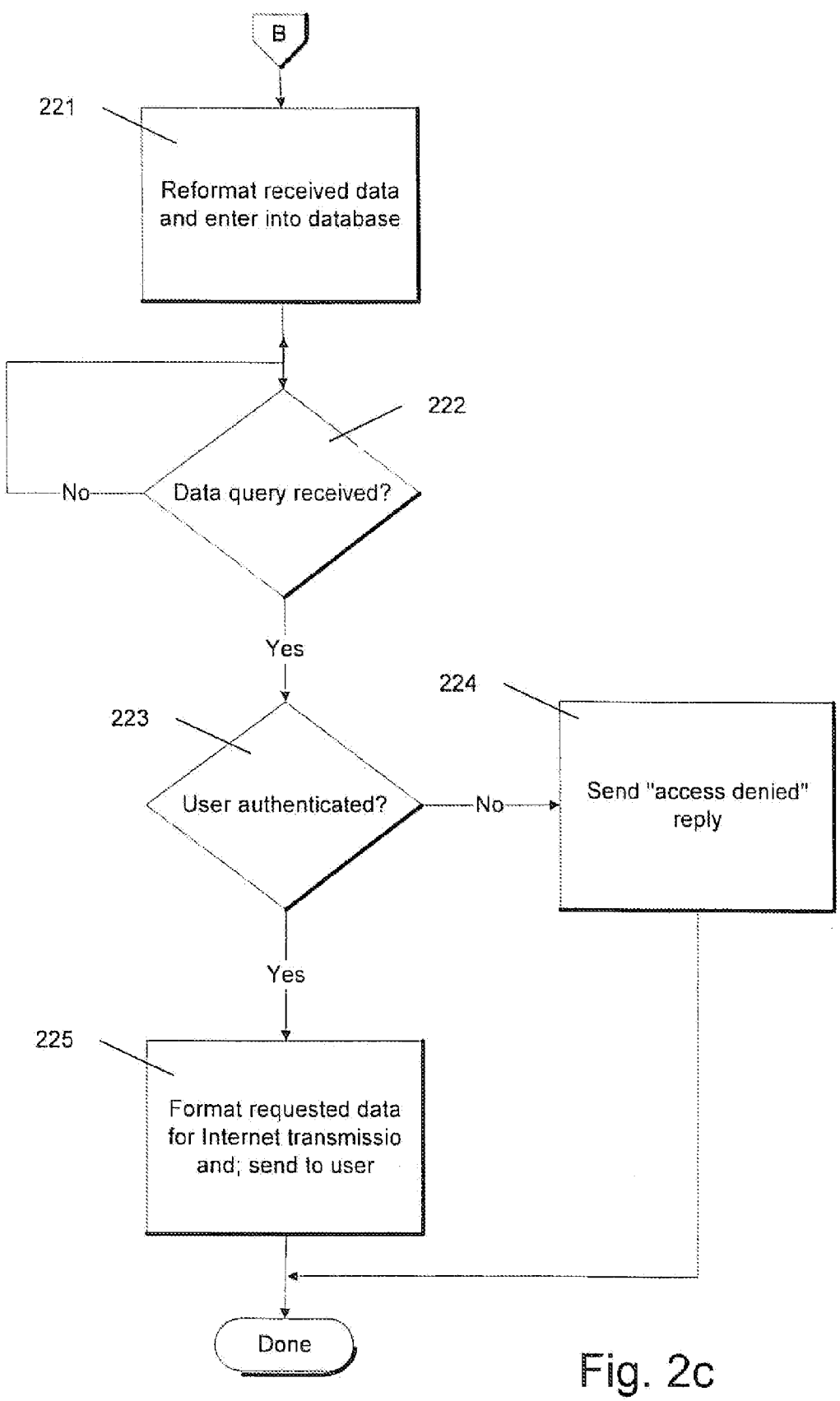

A flowchart of the procedure for transferring data from a device to a central server, where it can then be accessed by an authenticated user, is shown in FIG. 2. Steps 201 through 205 (FIG. 2a) are executed by the DCOM, steps 211 through 215 (FIG. 2b) by the CCOM and steps 221 through 225 (FIG. 2c) by the server.

Data generated by the device is periodically collected by the DCOM in response to some sort of triggering mechanism, typically a clock tick or in response to a command received from a user of the system. The DCOM then formats and stores the data (201) for subsequent retrieval. In response to a query from a CCOM (202), it reformats the data for transmission over the LAN used to communicate between the CCOM and its associated DCOMs (203). Alternatively, in some applications, the DCOM periodically initiates the transfer without an explicit query. In either case, the DCOM checks to determine if a successful transmission was acknowledged (204). If it was not, it retries the transmission, and, if several such retries are unsuccessful and if its configuration tables indicate that a backup CCOM is available, attempts to transfer the data to that CCOM (205).

The CCOM, on receiving new data from a DCOM similarly reformats the data for temporary storage (211) and waits for a request for data from the server (212). Like the DCOM, the CCOM can be programmed to initiate data transfers to the server on a periodic basis if the application so requires. In either event, the CCOM formats the data and transfers it to its associated server (213) and checks for the acknowledgement of a successful transfer (214). If none is received, it attempts a retransmission (215). If more than one WAN channel is available, some of the retry attempts are made using these alternative channels.

The server, on receiving the data, again reformats it (221), this time for storage in a database that can be accessed using application-specific programs. When a user application attempts to get access to the database (222), the access privileges of the user are first authenticated using standard authentication procedures (223). If the user is determined not to have the requisite access privileges for the type of access it is attempting, an "access denied" message is returned (224). Otherwise, the data is formatted as appropriate to the specific inquiry using an application-specific program and made available to the user (225).

Figure 3A:
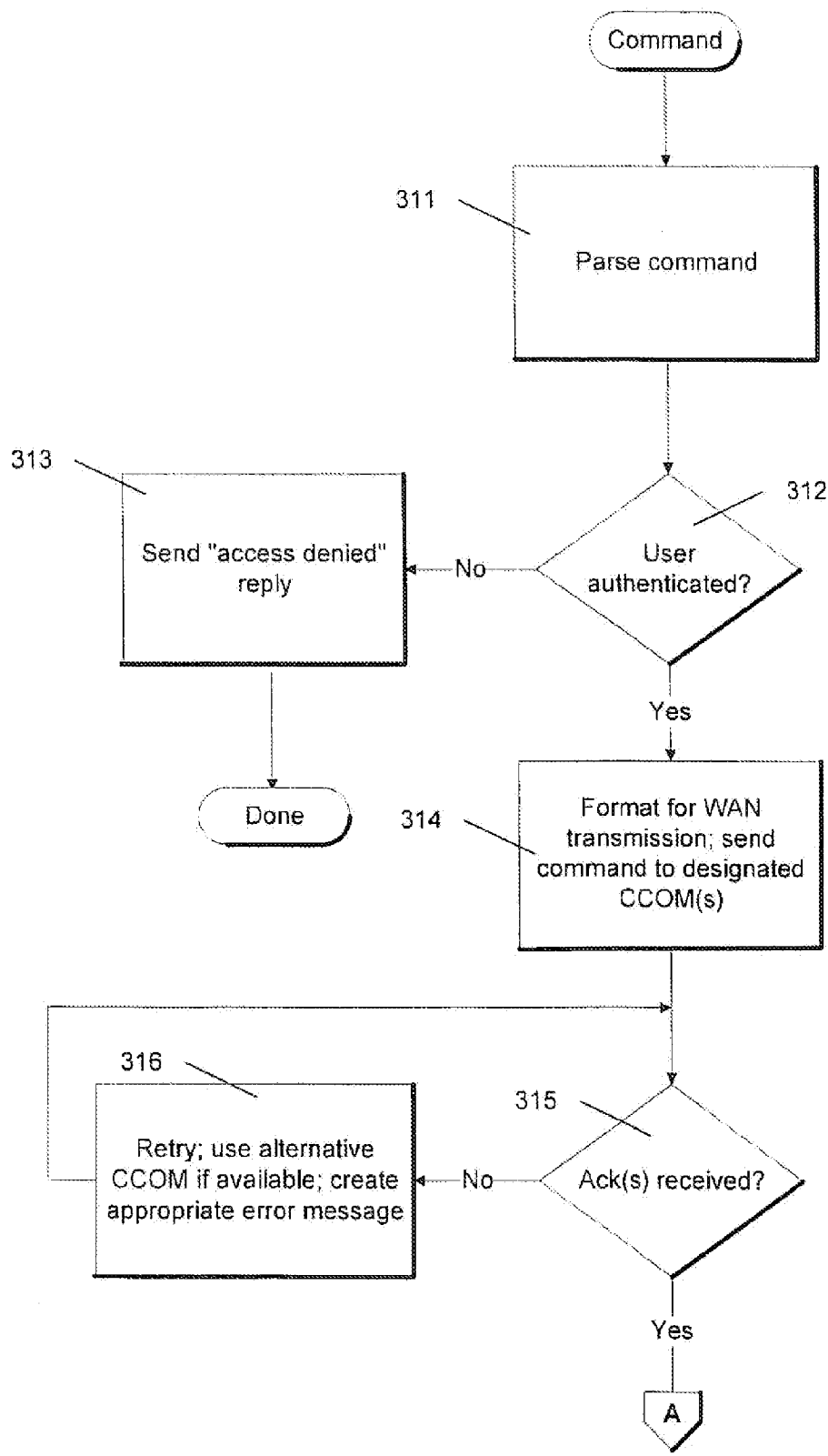
FIGS. 3a-3c show a flowchart describing a procedure whereby commands are transferred from a user through a central server to a specific device or subset of devices.
Figure 3B:
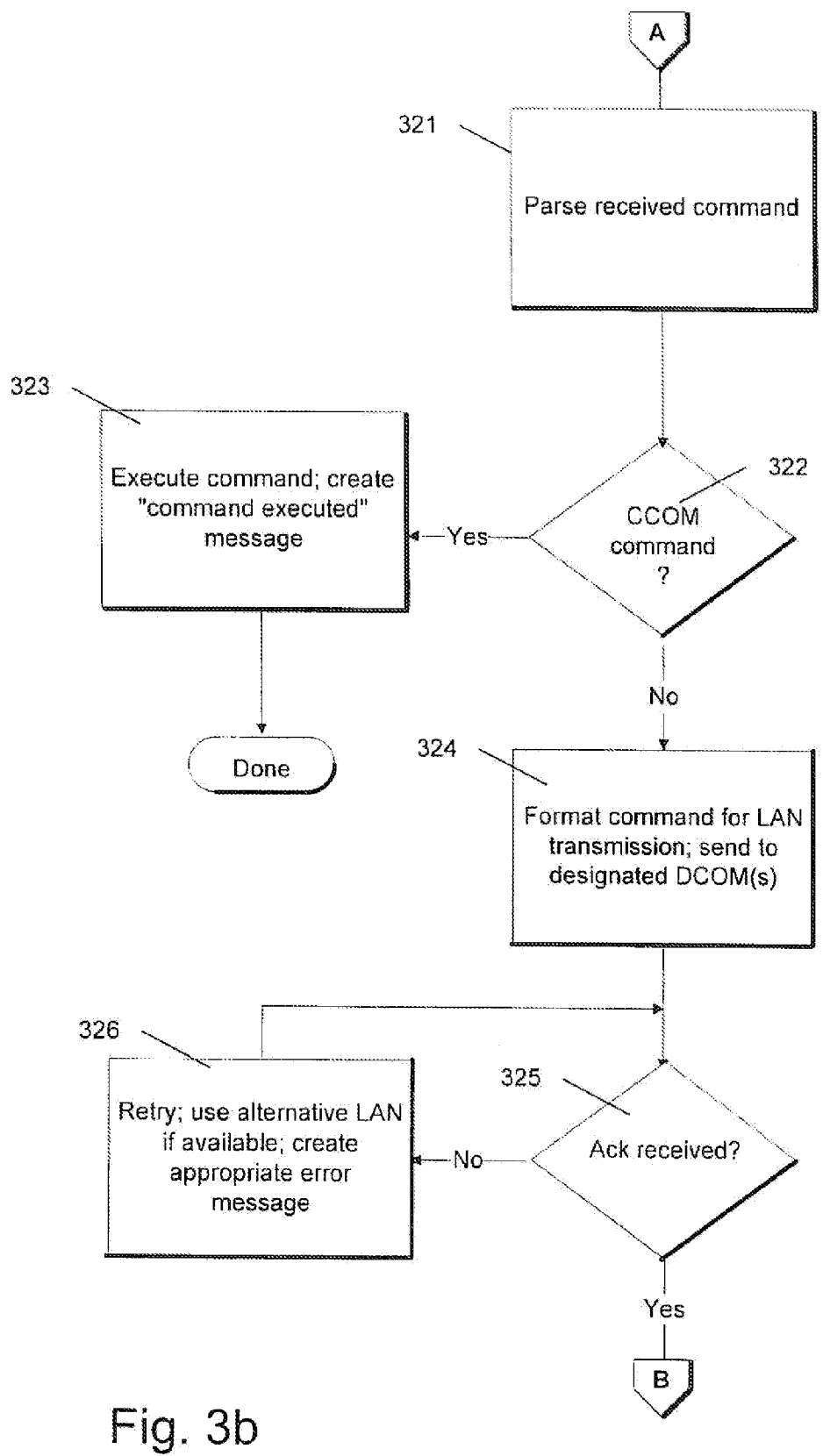
Figure 3C:
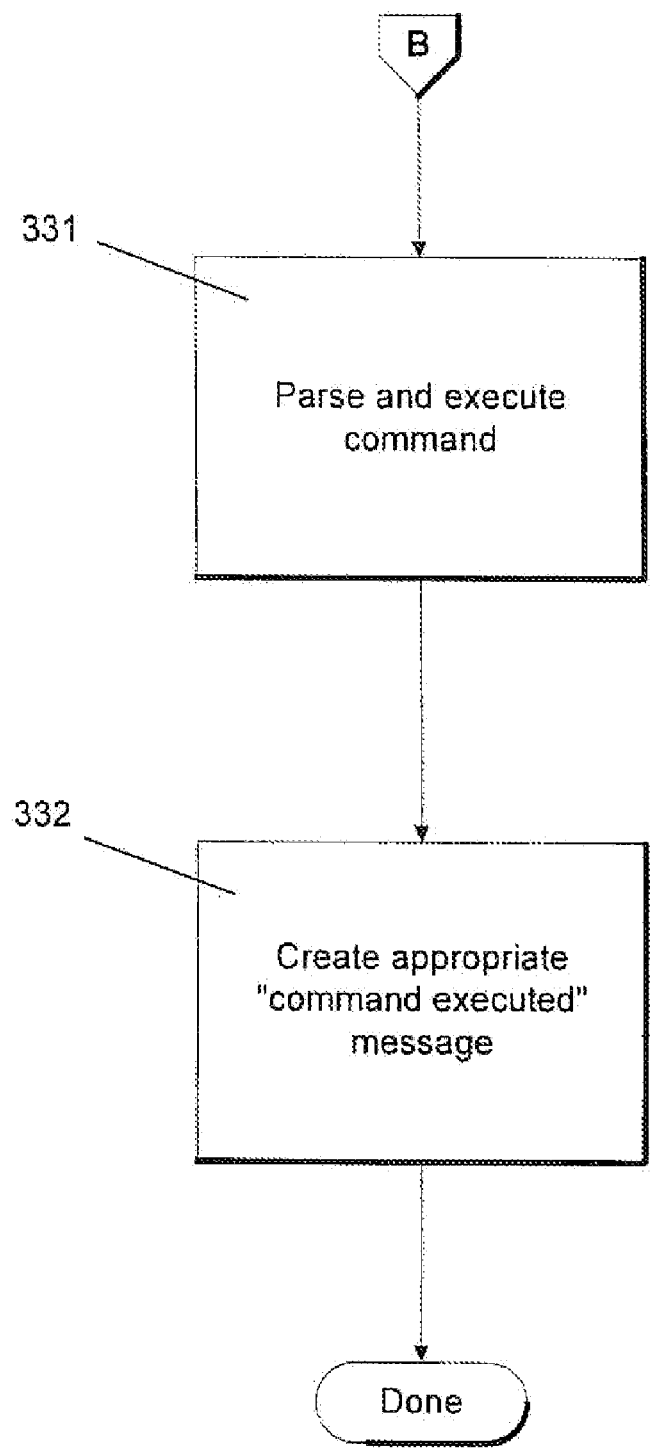

The procedure for sending commands from a user to a CCOM or DCOM is illustrated in the flowchart in FIG. 3. Here, steps 311 through 216 (FIG. 3a) are those implemented in the server, 321 through 326 (FIG. 3b) those implemented in the CCOM and 331 and 332 (FIG. 3c) those implemented in the DCOM.

User-initiated commands received by the server are first parsed (311) to determine the nature of the command. The server then determines if the user issuing the command in fact has the authority to do so (312). If it does not, an "access denied" response is returned to the user (313). If the user has the privileges needed to issue the command, the command is formatted for WAN transmission to the designated CCOM (314) and relayed on to it. If the transmission is not successful (315) and the command is destined for a DCOM, it checks its configuration tables to determine if the DCOM can be accessed through another CCOM and, if so, attempts to use that backup link (316). If its configuration tables indicate that an alternative WAN is available, the server may also attempt to reach the CCOM in question through that means as well.

The CCOM on receiving the command parses it (321) to determine, among other things, whether it is addressed to the CCOM or to one of its associated DCOMs (322). In the former case, it executes the command and generates a "command executed" message to be returned, using the previously described data transfer procedure, back to the server (323). In the latter case, I formats the command and transmits it to the designated DCOM or DCOMs (324). If a successful transfer is not acknowledged (325), it attempts to retransmit it and, if still unsuccessful, attempts to use an alternative LAN link if one is available (326). In any event, it generates an error message indicating the number of retries attempted, the LANs used and the eventual success or lack thereof in transmitting the command to its destination.

On receiving a command, the DCOM parses and executes it (331) and creates an appropriate "command executed message (332) to be returned to the server, and from there made available to the user, again using the previously described data transmission procedure. Command execution by a DCOM may entail relaying that command to one or more of its associated devices to, for example, control the set points on a thermostat or to switch on or off some subset of those devices for purposes of energy consumption management. In such applications, a DCOM is in effect a gateway to its associated devices, allowing them to be controlled remotely and at the same time providing a means for collecting information (e.g., the rate at which energy is being consumed at any given time) pertaining to those devices. Furthermore, the DCOM can be programmed to issue commands to its associated devices autonomously, executing stored or down-loaded algorithms for changing device settings based, for example, on current energy consumption rates and user profiles.

One embodiment of the DCOM is illustrated in FIG. 3. It consists of five basic sections: The microcontroller section (400), the LAN section (401), the device interface section (402), the service interface section (403) and the power section (404). The Microcontroller section is implemented in one preferred embodiment of the invention with Rabbit Semiconductor's model 2000 microcontroller supported by 128 Kbytes of static random access memory and 256 Kbytes of read-only memory. It is used to control signal flow on the DCOM and for first-level data aggregation, compression and protocol conversion. It can be programmed to support any device-specific communication protocol such as the DEX protocol for vending machine applications and the X.10 command-link protocol. It stores behavioral parameters that control the way in which this data collection and processing is executed. These parameters can be modified based on commands relayed to the DCOM from its associated CCOM.

The DCOM communicates with a centrally located CCOM over local-area network (LAN). In the embodiment shown in FIG. 4, the LAN is a low-power ISM-band radio-frequency link. The DCOM communicates over that link using rf transceiver 407 (e.g., Atmel Corporation's model RF211 transceiver) and SMA connector 408, which is connected to a half-wave antenna (not shown). This section is augmented, in the preferred embodiment, with rf microcontroller 406 (e.g., the ATmega32), used to offload microcontroller 400 by implementing the analog-to-digital and digital-to-analog conversion and other modulation functions needed to support rf transceiver 407. In other embodiments in which rf communication is impractical, other physical LAN links, such as Blue Tooth, power-line carrier (PLC), the HPNA (Home Phoneline Networking Alliance) protocol, or Ethernet links (including IEEE standard 802.11 a & b wireless Ethernet) can be supported using different implementations of LAN section 401.

Figure 4:
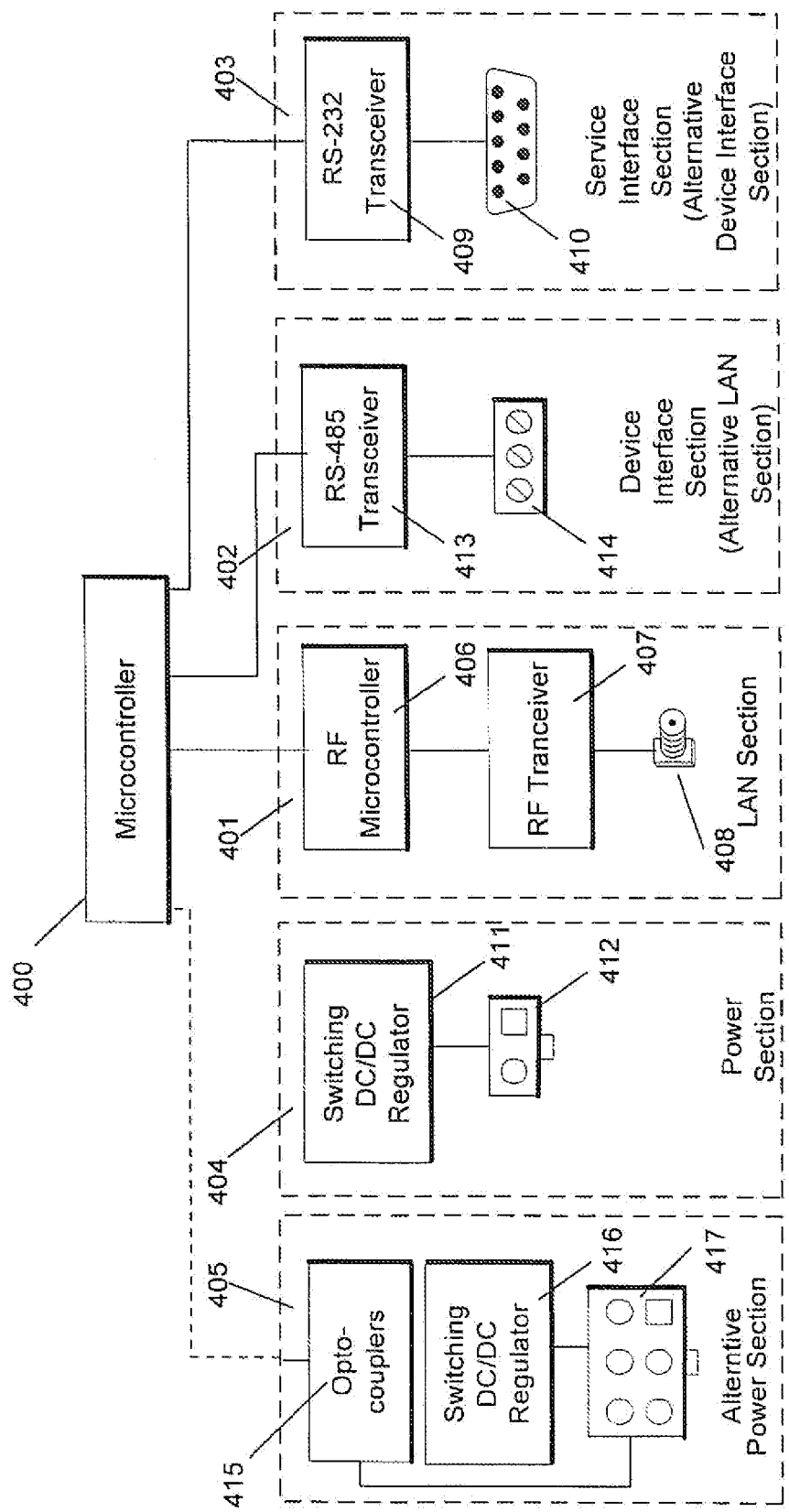
FIG. 4 is a block diagram of a generic device communications module along with insets showing some of the available options.

Data is received from and commands relayed to its associated device or devices through the device interface section 402, implemented in the embodiment shown in FIG. 4 with RS-485 port 414 and transceiver 413. In applications in which the device does not convey data through an RS-485 interface, this section is replaced by an interface section tailored to the device in question. Virtually any convenient physical link, including RS-232 and TTL links, can be supported through an appropriately modified device interface section 402.

Service section 403 is implemented with RS-232 transceiver 409 and male DB-9 connector 410 wired in the data terminal equipment (DTE) mode. It is used for on-site diagnostics and configuration purposes. In addition, in some applications in which data is presented by the device over an RS-232 link, this section can be used as the device interface section.

Power section 404 consists of a switching DC-to-DC regulator (411) and a power connector appropriate to the device. In some applications (e.g., some vending machine applications), data signals may also be transferred through the same connector that is used for power, in which case, an alternative power section such as 405 containing, in addition to the combined power and signal connector 417 and the switching regulator 416, a set of opto-couplers 415 used to provide electrical isolation between the DCOM and its associated device.

The RCOM is similar to a DCOM, and in fact can be identical to it, but with the microcontroller program enhanced so as to support its role both as a DCOM and as a relay between other DCOMs and a CCOM. In applications in which the RCOM is used purely as a relay, however, it can be implemented as a stripped down version of the DCOM, with, for example, sections 405 and 405 in FIG. 4 removed entirely. When serving as an rf-LAN relay, it time-multiplexes its communication activity, alternately communicating with its associated DCOMs and its associated CCOM.

The CCOM is implemented on a carrier board that contains a power converter and a local-area network interface enabling the CCOM to serve either as a LAN master or as a LAN peer and thereby communicate individually with each of its associated DCOMs. (In some applications in which only a single appliance is located at a site, the DCOM's device interface can be integrated directly onto the CCOM carrier board, thereby eliminating the need for a separate DCOM board.) The programmable computing, signal processing and communication logic that enable the data collected from the DCOMs to be processed and relayed over the Internet to the server level and the commands received from the server to be transferred to the DCOMs is implemented on a plug-in module, called the core module (CM), that is appliance independent. In this way, the amount of custom work needed to interface to different appliances is kept to a minimum, thereby significantly reducing the cost of the apparatus. The complexity associated with formatting, processing and storing data and supporting various communication protocols is implemented on the CM and does not need to be physically modified to support different applications.

Figure 5:
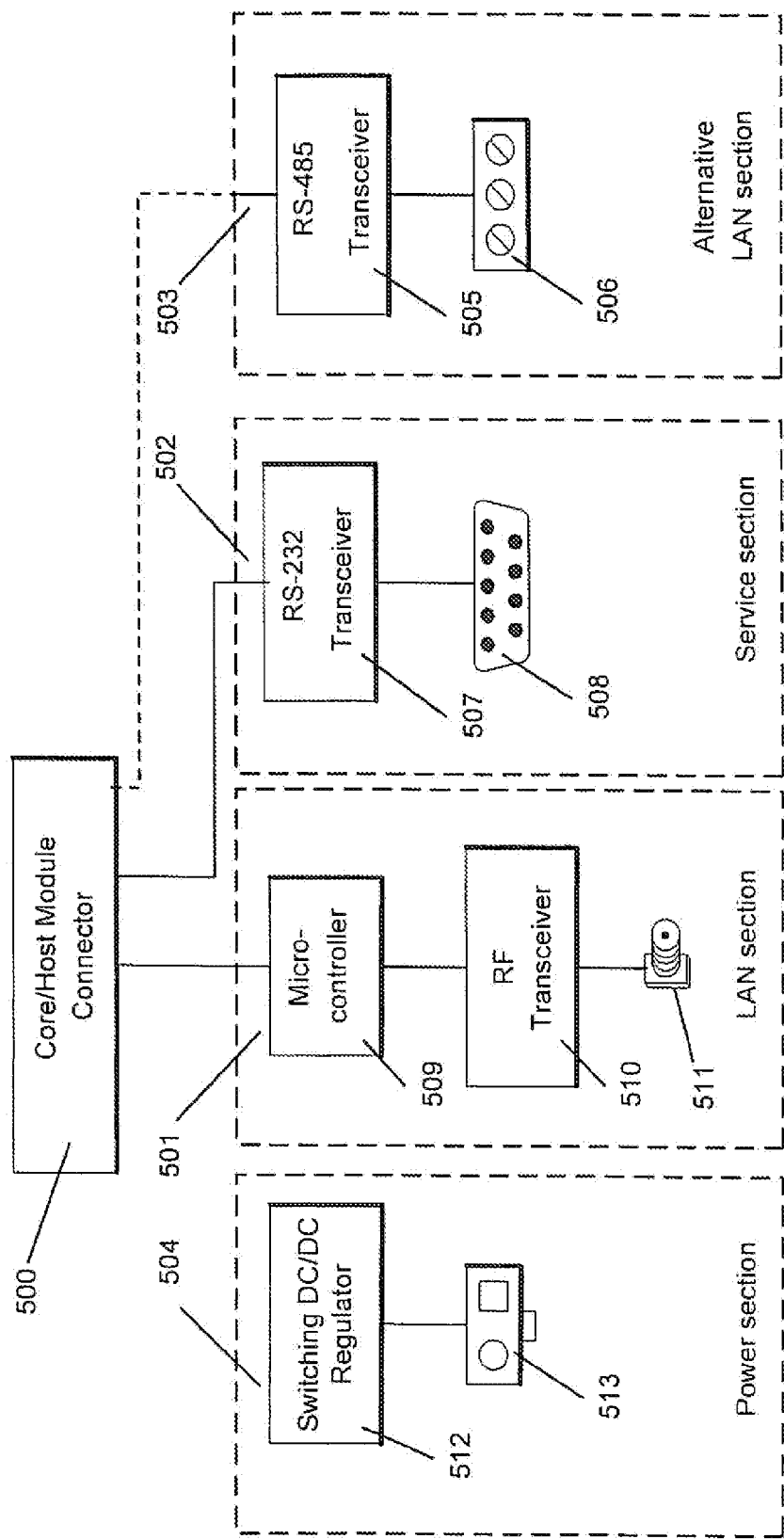
FIG. 5 is a block diagram of a cluster communications module also showing some of the available options.

The CCOM carrier board (FIG. 5) is similar in structure to the DCOM with the DCOM's microcontroller 400 replaced by connector 500 into which the appropriate core module can be plugged to give it both processing power and Internet access. It contains three basic interface sections: LAN section 501 (containing microcontroller 509, rf transceiver 510 and rf connector 511), service section 502 (comprising RS-232 transceiver 507 and DB-9 male connector 508) and power section 503 (containing switching regulator 512 and power connector 513). In applications in which a RS-485-based LAN is used rather than an rf LAN, LAN section 501 is replaced by alternative LAN section 504 consisting of a RS-485 transceiver 505 and connector 506. Each of these sections is identical to its DCOM counterpart. Moreover, in applications in which clustering is not feasible thereby requiring each device to have its own Internet access, the CCOM is implemented with the appropriate DCOM device interface (e.g., RS-232 interface 403 or RS-485 interface 402).

Figure 6A:
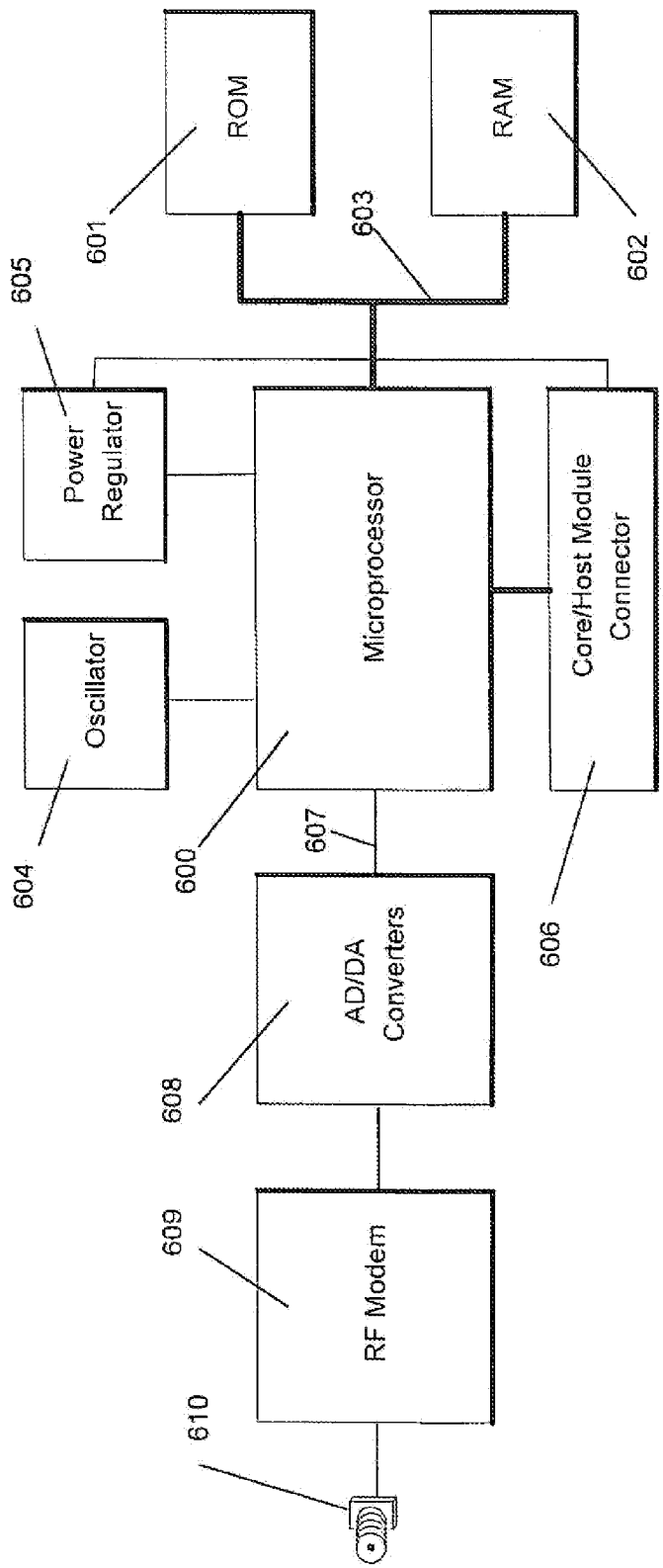
FIG. 6a is a block diagram of a core module having a GSM/GPRS interface.
Figure 6B:
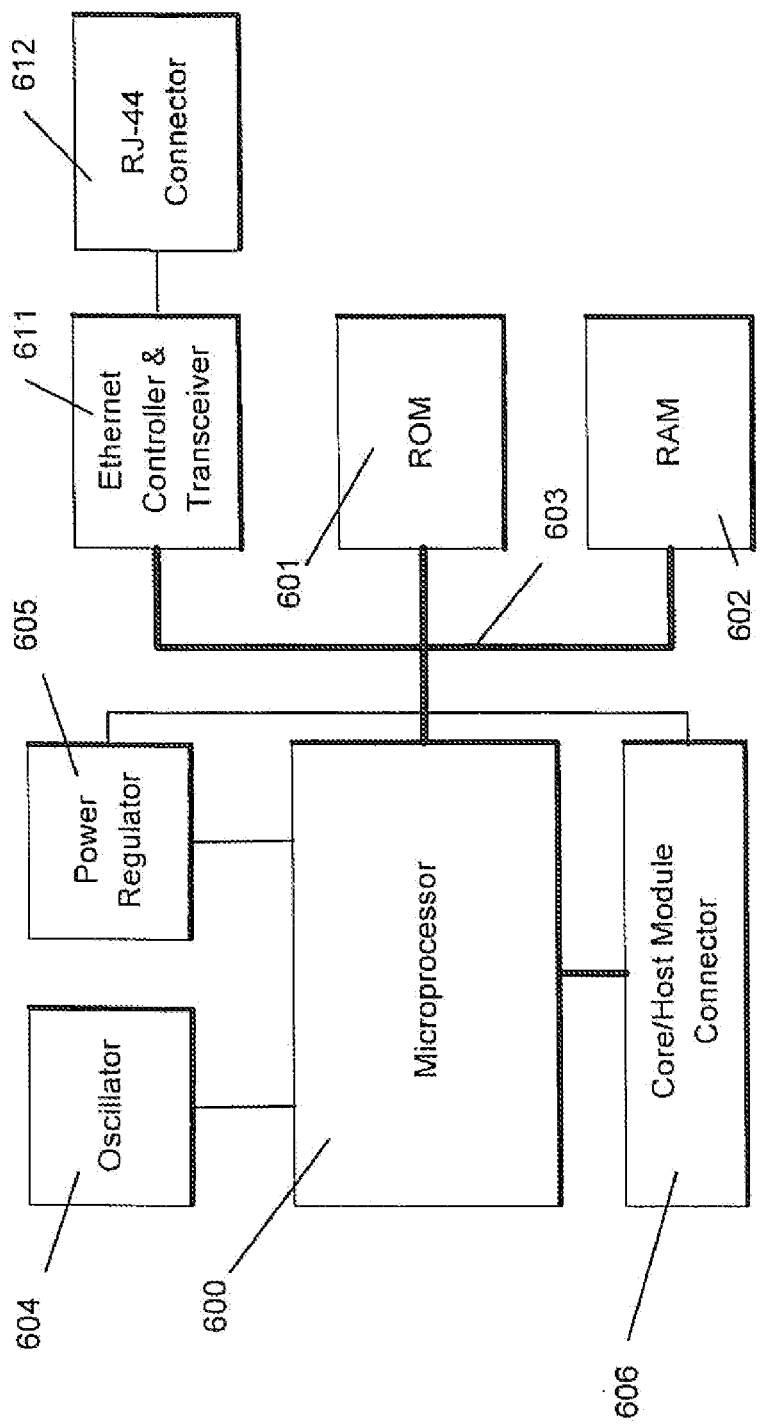
FIG. 6b is a block diagram of a core module having an Ethernet interface

The major difference between the CCOM and the DCOMs is in the core module itself. There are three versions of the CM, depending on its method of communicating with the Internet: the CM-G (FIG. 6*a*) is used for GSM/GPRS (Global System for Mobile communication/General Packet Radio Services) Internet access, the CM-E (FIG. 6*b*) for Ethernet access over a cable or digital subscriber loop (DSL) and. the CM-T (FIG. 6*c*) is used for telephonic access using a 56-Kbaud modem. The three core modules are identical except for the communications interface. Each CM contains a central processing unit 600 running a real-time kernel and having external address and data buses (603) to which both read-only (501) and random-access (602) memories are connected, an oscillator (604), a power regulator (605) and a connector (606) to mate with the corresponding connector (500) on the CCOM carrier board. Read-only memory 601 is used to store both the operating system code and the application code used to aggregate, compress, format and analyze the data received from the devices associated with each DCOM as well as the commands to be relayed to those devices. Random access memory 602 is used for buffering data transferred to and from the central server and for storing intermediate values calculated in processing and formatting that data.

In one preferred embodiment of the core module, the microprocessor is implemented with an Analog Devices Athena processor. An Athena chip includes a 32-bit, 39 MHz ARM7 processor core, a 16-bit, 78 MHz integrated digital signal processor (DSP), and 512 Kbytes of internal shared random-access memory. It also includes 24 Kbytes of DSP code and 16 KBytes of IDSP data memory. The DSP implements low-level data formatting and encoding and decoding operations associated with the serial digital data stream, thereby freeing up the microprocessor for higher-level operations. These higher-level operations include data aggregation and formatting for transfer to the central server and parsing and distributing control information received from the central server. Behavioral parameters that control the nature of the data to be collected by the DCOMs are also stored in the core module's random access memory and, when modified on command from the central server, are relayed to the appropriate DCOM(s), thereby enabling these parameters to be changed dynamically.

In addition to the above, the CM-G also contains analog-to-digital (AD) and digital-to-analog (DA) converters 608 connected to the microprocessor through its serial I/O bus 607. The AD and DA converters are implemented with Analog Devices' Pegasus chip in one preferred embodiment of the CM-G. This chip also implements the Gaussian-filtered minimum shift keying (GMSK) modulation and demodulation required for communication over wireless GSM/GPRS channels. Radio-frequency modulation and demodulation, amplification and filtering take place in rf-modem 609. The modem output is connected through if connector 610 to a half-wave antenna (not shown).

The core module CM-E (FIG. 6*b*) is used in installations, such as those having cable or digital subscriber loop (DSL) access, requiring Ethernet communication capability. In this module, AD/DA converters 608 and rf modem 609 are omitted and Ethernet controller and transceiver 611 and RJ-44 connector 612 are added to the microprocessor's address and data bus 603. One preferred embodiment of the CM-E uses the Realtek RTL8019AS, with its fully integrated 10Base-T Ethernet controller and transceiver, to implement this function. The CM-G's rf connector 610 is replaced in the CM-E with RJ-44 connector 512 for connection to a 10Base-T Ethernet cable.

Figure 6C:
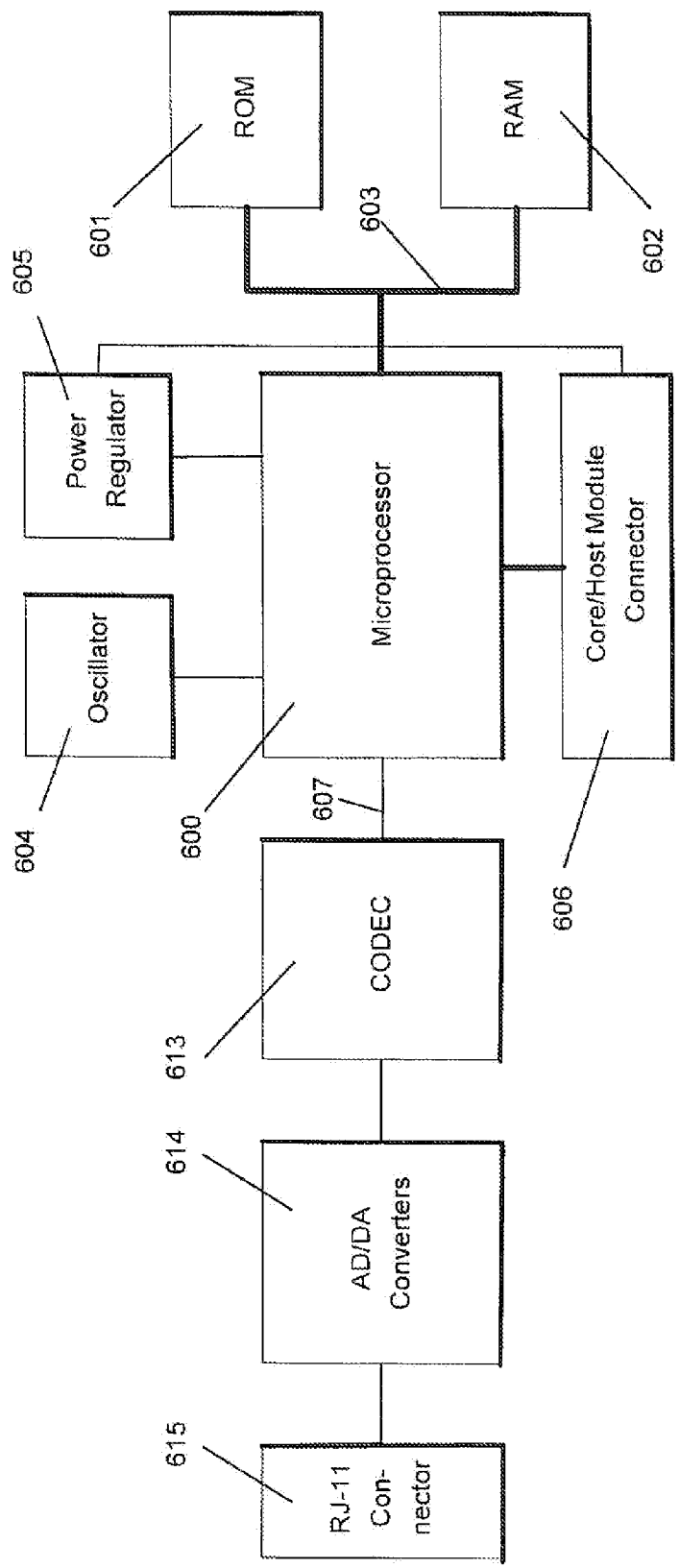
FIG. 6c is a block diagram of a core module having a telephonic interface.

A block diagram of the CM-T core module used for 56-Kbaud telephonic applications is shown in FIG. 6c. In this case, the logic represent by blocks 608, 609 and 610 in the CM-G block diagram are replaced, on the microprocessor's serial bus, by codec 613, AD and DA converters 614 and RJ-11 connector 615. Those telephony digital signal processing functions that cannot be implemented in the DSP associated with microprocessor 600 are implemented in voice-band codec 613 and DA/AD converters 614. One preferred embodiment of the CM-T module uses Analog Devices' AD1803 for codec 613 and the Claire's CPC510 for the DA/AD converters 614.

The server level is implemented with standard, off-the-shelf servers running software modules including: communications modules that support virtually all wireless access devices using standard cable and wireless communication protocols (e.g., IP, HTTP, XML); processing modules that enable information to be presented to the user in a visually consistent manner and in multiple languages; a system management module to enable users and operators to specify system configurations and behavioral parameters such as alert and alarm triggers; and customization modules particularized to the data collection and distribution requirements of each application. Data received from the CCOMs can be archived on the server and subsequently mined to discern appliance usage trends for operations management and prediction purposes.

The user level in the architecture encompasses the set of interfaces that enable a user of the system to gain access to the collected, aggregated and formatted data and to issue behavioral commands to any subset of the CCOMs and DCOMs comprising the system of interest. All standard user Internet access devices are supported (e.g., personal computers, laptops, Palm-based systems, WindowsCE-based hand-held computers, etc). Depending on the application and on the Internet access device being used, software applications can be run on the user device providing even greater data access and control capability. Again, depending on the application, the user has the ability to issue commands that are relayed by the server to a specific CCOM, and through it to a specific DCOM or set of DCOMs, thereby setting various appliance parameters such as item pricing in a vending machine or set points in a thermostat.

Figure 7:
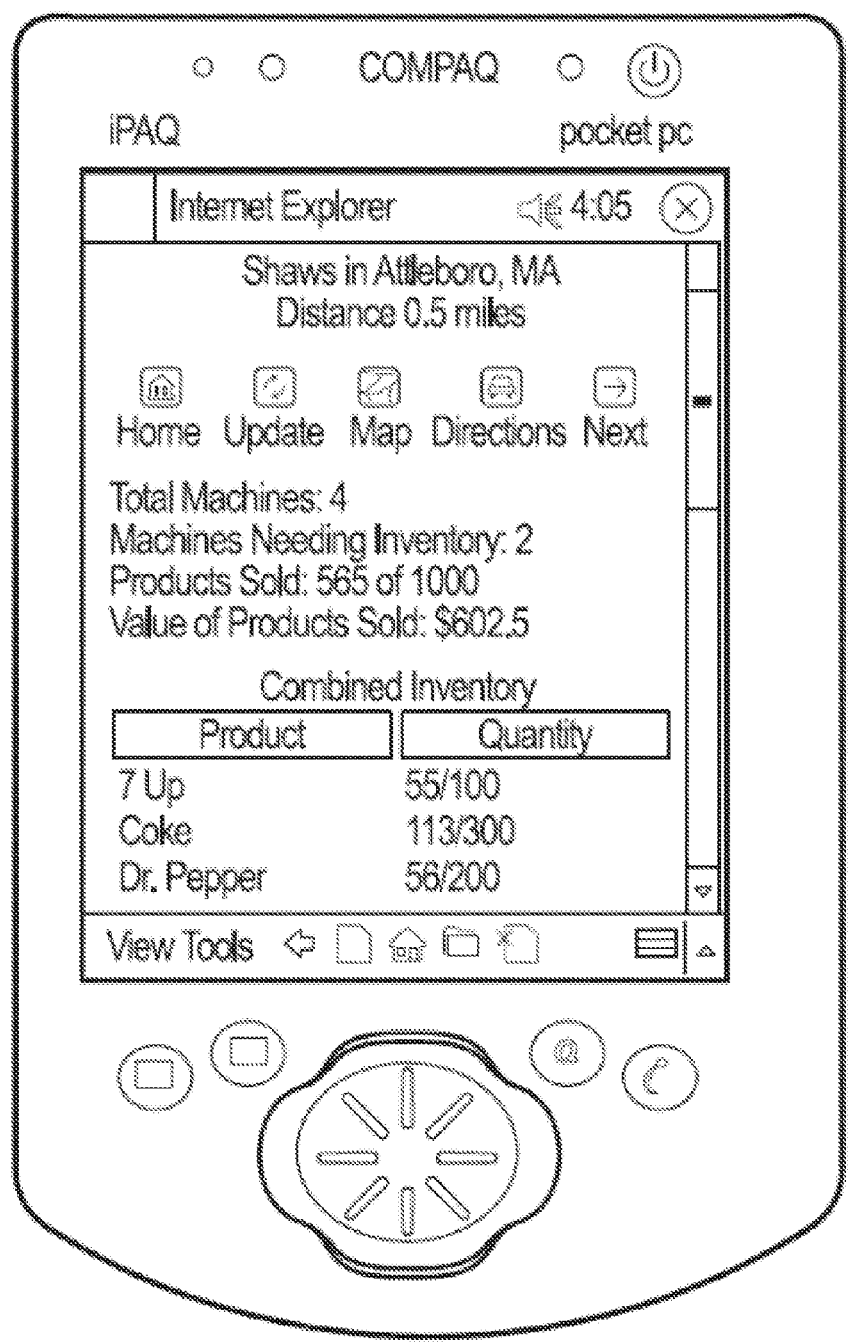
FIG. 7 shows a typical handheld computer display in a vending machine application.

A typical user level display if shown in FIG. 7. In this case, the application involves the maintenance of a set of vending machines and the display is shown on a Compaq Corporation's IPAQ hand-held computer. This particular screen shows the state of the four vending machines at one particular installation, including the number and dollar value of the products sold at that location since it was last serviced and the current inventory of each of the vending machines there, as well as the distance between that location and the user. Users can request other menu-driven displays, for example, an aggregation of the inventory needs of all vending machines in a given area, depending upon their needs and objectives.

Figure 8:
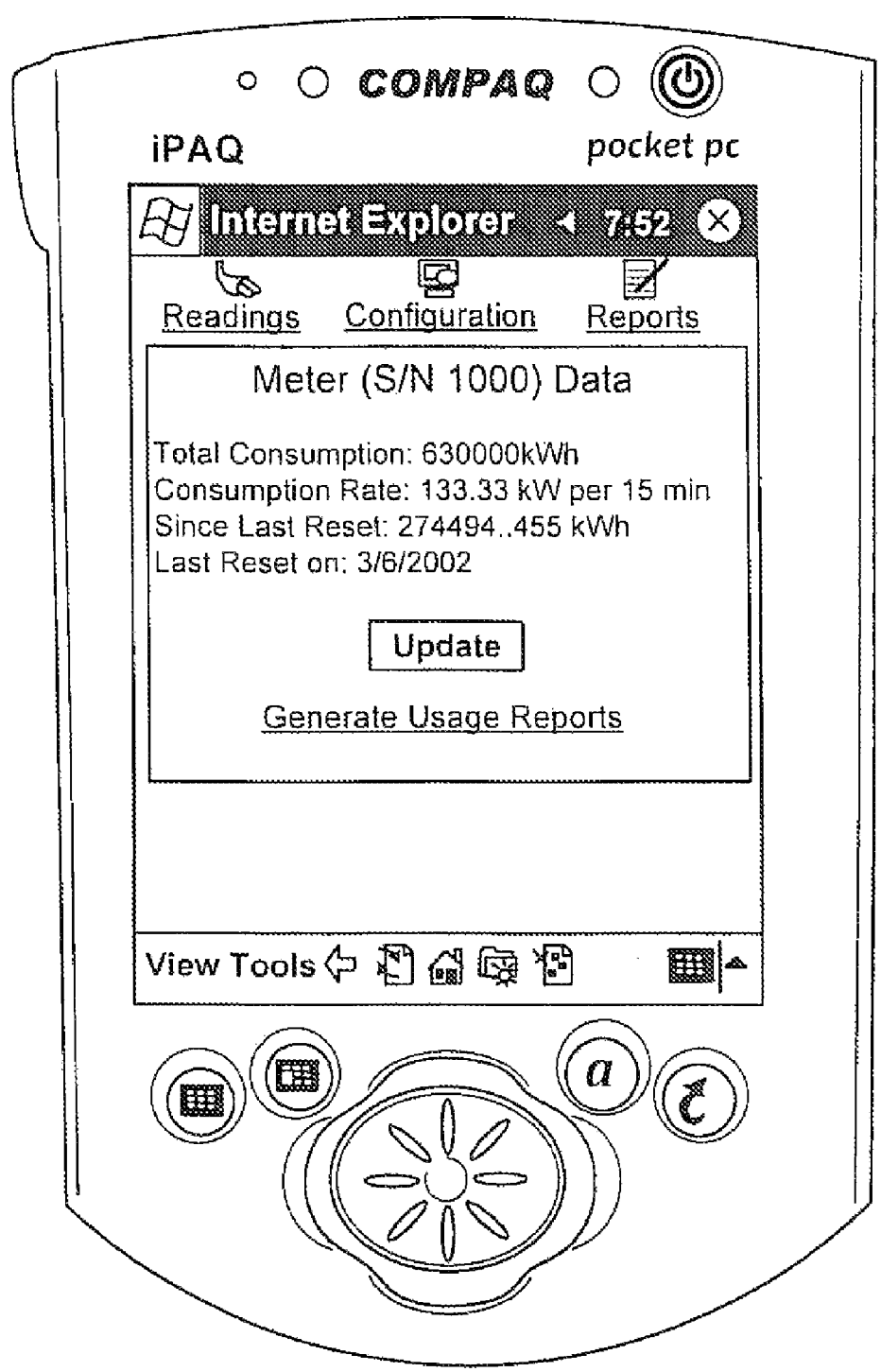
FIG. 8 shows a typical handheld computer display in an electrical metering application.

Other applications, of course, require different information to be displayed at the user level. FIG. 8, for example, shows a typical display for a metering application. This display shows both the current rate of electrical power consumption at a specific site identified by the serial number of the meter and the total consumption at that site since the time that meter was last reset. Other screens can be selected to show similar information aggregated across any subset of DCOM-equipped meters.

What is claimed is:

1. A cluster communications module, comprising:
   a core module;
   a local area network (LAN) communication device coupled to the core module; and
   a wide area network (WAN) communication device coupled to the core module;
   wherein the core module transmits and receives data through the LAN communication device via a first communications protocol and transmits and receives data through the WAN communications protocol.

2. The cluster communications module of claim 1, wherein the core module further comprises:
   a central processing unit; and
   at least one memory.

3. The cluster communications module of claim 2, wherein the core module further comprises:
   at least one data buss coupled to the central processing unit;
   an oscillator coupled to the central processing unit; and
   a power regulator coupled to the central processing unit,
   wherein the at least one memory further comprises:
      a read-only memory (ROM) in communication with the at least one data bus;
      a random access memory (RAM) in communication with the at least one data bus.

4. The cluster communications module of claim 1, wherein the cluster communications module is adapted to electronically communicate with a second cluster communications module via the WAN communications protocol.

5. The cluster communications module of claim 1, wherein the cluster communications module is adapted to electronically communicate with a device communications module via the LAN communications protocol.

6. The cluster communications module of claim 1, wherein the WAN communications protocol is selected from the group consisting of at least: telephony protocol, Ethernet protocol, global system for mobile (GSM) protocol, general packet radio services (GPRS) protocol, and radio frequency (RF) protocol.

7. The cluster communications module of claim 1, wherein the LAN communications protocol is selected from the group consisting of at least: radio frequency (RF) protocol, and Ethernet protocol.

8. A method for transmitting appliance data from an appliance, the method comprising:
   collecting the appliance data generated at the appliance by a first communications device, the first communications device being configured to format and store the collected data;
   transmitting by the first communications device the formatted data over a local area network (LAN) to a second communications device; and
   checking for a first acknowledgement from the second communications by the first communications device.

9. The method of claim 8, further comprising:
   retransmitting the formatted data to the second communications device by the first communications device upon failing to detect the first acknowledgement from the second communications device;
   checking for a second acknowledgement from the second communications device by the first communications device; and
   retransmitting the formatted data to a third communications device by the first communications device after at least two failed transmissions to the second communications device upon failing to detect the second acknowledgement from the second communications device, wherein the third communications device acknowledges a received transmission.

10. The method of claim 9, further comprising:
reformatting and storing the received data at least one of the second communications device and the third communications device; and
retransmitting by at least one of the second communications device and the third communications device the reformatted data.

11. The method of claim 10, wherein retransmitting further comprises retransmitting the reformatted data over a wide area network (WAN).

12. The method of claim 8, wherein the appliance is a utility meter.

13. The method of claim 8, wherein at least one of the LAN and the WAN is a wireless network.

14. The method of claim 8, wherein the LAN and the WAN use two different communications protocols.

15. A device communications module communicatively coupled to an appliance, comprising:
a core module;
a local area network (LAN) communication device coupled to the core module and being adapted to transmit data to and receive data from the appliance via a first communications protocol; and
a wide area network (WAN) communication device coupled to the core module and being adapted to transmit data to and receive data from a second communications module via a second communications protocol.

16. The device communications module of claim 15, wherein the second communications module is at least one of a device communications module and a cluster communications module.

17. The device communications module of claim 15, wherein the first communications protocol differs from the second communications protocol.

18. The device communications module of claim 15, wherein the core module further comprises:
a central processing unit; and
at least one memory.

19. The device communications module of claim 18, wherein the core module further comprises:
at least one data bus coupled to the central processing unit;
an oscillator coupled to the central processing unit; and
a power regulator coupled to the central processing unit,
wherein the at least one memory further comprises:
a read-only memory (ROM) coupled to the at least one data bus; and
a random access memory (RAM) coupled to the at least one data bus.

20. The device communications module of claim 15, wherein the appliance is a utility meter.

* * * * *